(12) United States Patent
Khalil et al.

(10) Patent No.: US 11,177,567 B2
(45) Date of Patent: Nov. 16, 2021

(54) ANTENNA ARRAY CALIBRATION SYSTEMS AND METHODS

(71) Applicant: Analog Devices Global Unlimited Company, Hamilton (BM)

(72) Inventors: Ahmed I. Khalil, Cairo (EG); Mohamed Ahmed Youssef Abdalla, Cairo (EG); Islam A. Eshrah, Cairo (EG); Mohamed Mobarak, Cairo (EG)

(73) Assignee: Analog Devices Global Unlimited Company, Hamilton (BM)

( * ) Notice: Subject to any disclaimer, the term of this patent is extended or adjusted under 35 U.S.C. 154(b) by 301 days.

(21) Appl. No.: 15/904,045

(22) Filed: Feb. 23, 2018

(65) Prior Publication Data

US 2019/0267707 A1   Aug. 29, 2019

(51) Int. Cl.
| | |
|---|---|
| *H01Q 3/26* | (2006.01) |
| *H04B 17/12* | (2015.01) |
| *H04B 17/19* | (2015.01) |
| *H01Q 1/24* | (2006.01) |
| *H01Q 3/38* | (2006.01) |
| *H01Q 21/22* | (2006.01) |
| *H01Q 21/00* | (2006.01) |

(Continued)

(52) U.S. Cl.
CPC .............. *H01Q 3/267* (2013.01); *H01Q 1/247* (2013.01); *H01Q 3/38* (2013.01); *H01Q 21/0025* (2013.01); *H01Q 21/22* (2013.01); *H04B 17/12* (2015.01); *H04B 17/19* (2015.01); *H04B 17/21* (2015.01); *H04B 17/14* (2015.01)

(58) Field of Classification Search
CPC ........ H01Q 3/267; H01Q 21/22; H04B 17/12; H04B 17/21; H04B 17/24
See application file for complete search history.

(56) References Cited

U.S. PATENT DOCUMENTS

| | | | | |
|---|---|---|---|---|
| 4,864,315 A | * | 9/1989 | Mohuchy | G01R 29/105 343/703 |
| 5,235,342 A | * | 8/1993 | Orton | H01Q 3/26 343/703 |
| 5,412,414 A | | 5/1995 | Ast et al. | |

(Continued)

FOREIGN PATENT DOCUMENTS

| | | |
|---|---|---|
| CN | 101479885 A | 7/2009 |
| CN | 101904051 A | 12/2010 |

(Continued)

OTHER PUBLICATIONS

U.S. Appl. No. 15/611,289, including its ongoing prosecution history, including without limitation Office Actions, Amendments, Remarks, and any potentially relevant documents, filed Jun. 1, 2017, Khalil et al.

(Continued)

*Primary Examiner* — Jinsong Hu
*Assistant Examiner* — Rui M Hu
(74) *Attorney, Agent, or Firm* — Knobbe, Martens, Olson & Bear, LLP

(57) ABSTRACT

Aspects of this disclosure relate to an antenna array system and method of calibration using one or more probes disposed equidistant between antenna elements. In certain embodiments, calibration is performed between a probe and antenna elements, between a plurality of antenna elements, and/or between antenna elements on different antenna arrays.

20 Claims, 26 Drawing Sheets

(51) Int. Cl.
*H04B 17/21* (2015.01)
*H04B 17/14* (2015.01)

(56) References Cited

U.S. PATENT DOCUMENTS

| | | | |
|---|---|---|---|
| 5,581,517 A | 12/1996 | Gee et al. | |
| 5,657,023 A * | 8/1997 | Lewis | H01Q 3/2652 342/174 |
| 5,864,317 A | 1/1999 | Boe et al. | |
| 5,864,543 A * | 1/1999 | Hoole | H04B 17/16 370/280 |
| 6,104,935 A * | 8/2000 | Smith | H01Q 1/246 455/562.1 |
| 6,133,868 A * | 10/2000 | Butler | H01Q 3/267 342/165 |
| 6,208,287 B1 * | 3/2001 | Sikina | H01Q 3/267 342/174 |
| 6,252,542 B1 * | 6/2001 | Sikina | H01Q 3/267 342/174 |
| 6,356,233 B1 * | 3/2002 | Miller | H01Q 3/267 342/174 |
| 6,624,784 B1 * | 9/2003 | Yamaguchi | H01Q 3/2605 342/372 |
| 7,068,218 B2 * | 6/2006 | Gotti | H01Q 1/246 342/368 |
| 7,362,266 B2 | 4/2008 | Collinson | |
| 7,471,237 B2 | 12/2008 | Wooldridge | |
| 7,576,686 B2 | 8/2009 | Needham et al. | |
| 7,714,776 B2 * | 5/2010 | Cooper | H01Q 3/267 342/174 |
| 7,904,117 B2 | 3/2011 | Doan et al. | |
| 7,911,376 B2 | 3/2011 | Hardacker et al. | |
| 8,004,456 B2 | 8/2011 | Scott | |
| 8,045,926 B2 | 10/2011 | Martikkala et al. | |
| 8,199,048 B1 * | 6/2012 | Sanchez | G01S 7/4004 342/174 |
| 8,295,788 B2 | 10/2012 | Rofougaran et al. | |
| 8,559,571 B2 | 10/2013 | Tung et al. | |
| 8,593,337 B2 * | 11/2013 | Ookawa | H01Q 3/36 342/174 |
| 8,976,845 B2 | 3/2015 | O'Keeffe et al. | |
| 9,035,828 B2 | 5/2015 | O'Keeffe et al. | |
| 9,113,346 B2 | 8/2015 | Pivit et al. | |
| 9,319,904 B1 | 4/2016 | Srinivasa et al. | |
| 9,331,751 B2 | 5/2016 | Sikina et al. | |
| 9,444,577 B1 | 9/2016 | Zhang et al. | |
| 9,628,256 B2 | 4/2017 | O'Keeffe et al. | |
| 9,692,530 B2 * | 6/2017 | O'Keeffe | H01Q 21/24 |
| 9,705,611 B1 * | 7/2017 | West | H04B 17/21 |
| 9,762,283 B2 | 9/2017 | Chen et al. | |
| 9,876,514 B1 | 1/2018 | Corman et al. | |
| 9,912,467 B2 | 3/2018 | Alpert et al. | |
| 10,211,527 B2 | 2/2019 | Safavi-Naeini et al. | |
| 10,263,650 B2 | 4/2019 | Corman et al. | |
| 10,305,564 B1 | 5/2019 | Stang et al. | |
| 10,469,183 B1 * | 11/2019 | Kuo | H04B 17/12 |
| 2001/0005685 A1 * | 6/2001 | Nishimori | H01Q 3/267 455/562.1 |
| 2002/0089447 A1 * | 7/2002 | Li | H01Q 3/267 342/368 |
| 2002/0171583 A1 * | 11/2002 | Purdy | H01Q 3/267 342/368 |
| 2004/0032365 A1 * | 2/2004 | Gotti | H01Q 1/246 342/368 |
| 2004/0061644 A1 * | 4/2004 | Lier | H01Q 21/22 342/368 |
| 2006/0234694 A1 * | 10/2006 | Kawasaki | H04B 17/10 455/423 |
| 2006/0273959 A1 * | 12/2006 | Kawasaki | H01Q 3/267 342/368 |
| 2008/0129613 A1 * | 6/2008 | Ermutlu | H01Q 3/267 343/703 |
| 2008/0225174 A1 | 9/2008 | Greggain et al. | |
| 2009/0267824 A1 * | 10/2009 | Cooper | H01Q 3/267 342/174 |
| 2010/0117890 A1 | 5/2010 | Vook et al. | |
| 2011/0006949 A1 * | 1/2011 | Webb | H01Q 3/267 342/372 |
| 2012/0027066 A1 * | 2/2012 | O'Keeffe | H04B 7/10 375/224 |
| 2012/0146840 A1 * | 6/2012 | Ookawa | H01Q 3/267 342/165 |
| 2013/0077708 A1 | 3/2013 | Sorrells et al. | |
| 2013/0120190 A1 | 5/2013 | McCune, Jr. | |
| 2013/0234883 A1 * | 9/2013 | Ma | G01S 7/2813 342/174 |
| 2014/0111373 A1 * | 4/2014 | Puzella | G01S 13/4463 342/174 |
| 2014/0169509 A1 * | 6/2014 | Tsofe | H04B 17/12 375/344 |
| 2014/0210668 A1 * | 7/2014 | Wang | H04B 7/0617 342/372 |
| 2014/0242914 A1 * | 8/2014 | Monroe | H04B 17/21 455/63.4 |
| 2014/0354507 A1 * | 12/2014 | Maca | H01Q 1/246 343/853 |
| 2015/0115978 A1 * | 4/2015 | Bories | H01Q 5/22 324/601 |
| 2015/0138026 A1 * | 5/2015 | Shay | H04B 17/12 343/703 |
| 2015/0255868 A1 | 9/2015 | Haddad et al. | |
| 2016/0043465 A1 * | 2/2016 | McDevitt | G01S 13/74 342/368 |
| 2016/0191176 A1 | 6/2016 | O'Keeffe et al. | |
| 2016/0197660 A1 | 7/2016 | O'Keeffe et al. | |
| 2017/0117950 A1 * | 4/2017 | Strong | H04B 7/0452 |
| 2017/0234971 A1 * | 8/2017 | Arai | H04L 5/0048 342/174 |
| 2017/0310004 A1 * | 10/2017 | Swirhun | H01Q 3/28 |
| 2017/0324486 A1 * | 11/2017 | Garcia | H04B 17/102 |
| 2018/0034565 A1 * | 2/2018 | Tankielun | H01Q 3/267 |
| 2018/0062260 A1 | 3/2018 | Khalil et al. | |
| 2018/0198537 A1 * | 7/2018 | Rexberg | H01Q 3/267 |
| 2019/0058530 A1 | 2/2019 | Rainish et al. | |
| 2019/0149247 A1 * | 5/2019 | Ananth | H04B 7/0634 375/267 |
| 2019/0158194 A1 * | 5/2019 | Wang | H04B 17/12 |
| 2020/0014105 A1 * | 1/2020 | Braun | H01Q 3/2652 |
| 2020/0091608 A1 | 3/2020 | Alpman et al. | |
| 2020/0322068 A1 * | 10/2020 | Jidhage | H04B 17/12 |

FOREIGN PATENT DOCUMENTS

| | | |
|---|---|---|
| CN | 102347532 A | 2/2012 |
| EP | 2173010 | 4/2010 |
| EP | 2273614 | 1/2011 |
| EP | 2 285 102 | 2/2011 |
| KR | 10-1564730 B1 | 10/2015 |
| WO | WO 2018/119153 | 6/2018 |
| WO | WO 2018/166575 A1 | 9/2018 |

OTHER PUBLICATIONS

Kumar, M., et al., "Broad-Band Active Phase Shifter Using Dual-Gate MESFET", IEEE Transactions on Microwave Theory and Techniques, vol. MTT-29, No. 10, Oct. 1981, pp. 1098-1102.

Valdes-Garcia et al., "A Fully Integrated 16-Element Phased-Array Transmitter in SiGe BiCMOS for 60-GHz Communications," IEEE Journal of Solid-State Circuits (Dec. 12, 2010) vol. 45, No. 12, pp. 2757-2773.

U.S. Appl. No. 15/590,903, including its ongoing prosecution history, including without limitation Office Actions, Amendments, Remarks, and any potentially relevant documents, filed May 9, 2017, O'Brien et al.

Agrawal, et al., "A Calibration Technique for Active Phased Array Antennas," Johns Hopkins University Applied Physics Laboratory, 2003, in 8 pages.

Jing, et al., "Self-Calibration for the Multiple Channel Phase Array System Based on NearField Weighting," Key Laboratory of Elec-

(56) References Cited

OTHER PUBLICATIONS tronics and Information Technology in Satellite Navigation (Beijing Institute of Technology, 100081) Ministry of Education, Beijing, China, Radar Conference 2015, IET International, 6 pages.

Kanemaru, et al., "79 GHz CMOS Circuits for Phase/Amplitude Calibration in High-resolution Beamforming Radar System", Proceedings of the 43rd European Microwave Conference, pp. 1615-1618, 2013.

Sato, et al., "Millimeter wave CMOS integrated circuit for multi-gigabit communication and radar applications", Radio-Frequency Integration Technology (RFIT) 2015 IEEE International Symposium on, pp. 49-51, 2015.

Shipley, et al., "Mutual Coupling-Based Calibration of Phased Array Antennas," Technology Service Corporation, 2000, in 4 pages.

Seker, "Calibration methods for phased array radars," Radar Systems Engineering Department, ASELSAN, Ankara, Turkey, 2016, in 16 pages.

International Search Report dated Nov. 7, 2017 for International Application No. PCT/EP2017/071427, 6 pages.

Written Opinion of the International Searching Authority dated Nov. 7, 2017 for International Application No. PCT/EP2017/071427, 10 pages.

U.S. Appl. No. 15/611,289 including its ongoing prosecution history, including without limitation Office Actions, Amendments, Remarks, and any potentially relevant documents.

Office Action dated Jun. 10, 2020 for Chinese Patent Application No. 201780051930.1, 8 pages and 9 page translation.

"A calibration technique for active phased array antennas," Phased Array Systems and Technology, 2003, in 3 pages.

"Mutual coupling-based calibration of phased array antennas," Phased Array Systems and Technology, 2000, in 3 pages.

Chinese Office Action dated Sep. 23, 2020, in Chinese Patent Application No. 201910130843.6. 8 pages.

European Search Report dated Jul. 22, 2020 for European Patent Application No. 20160945.0. 7 pages.

\* cited by examiner

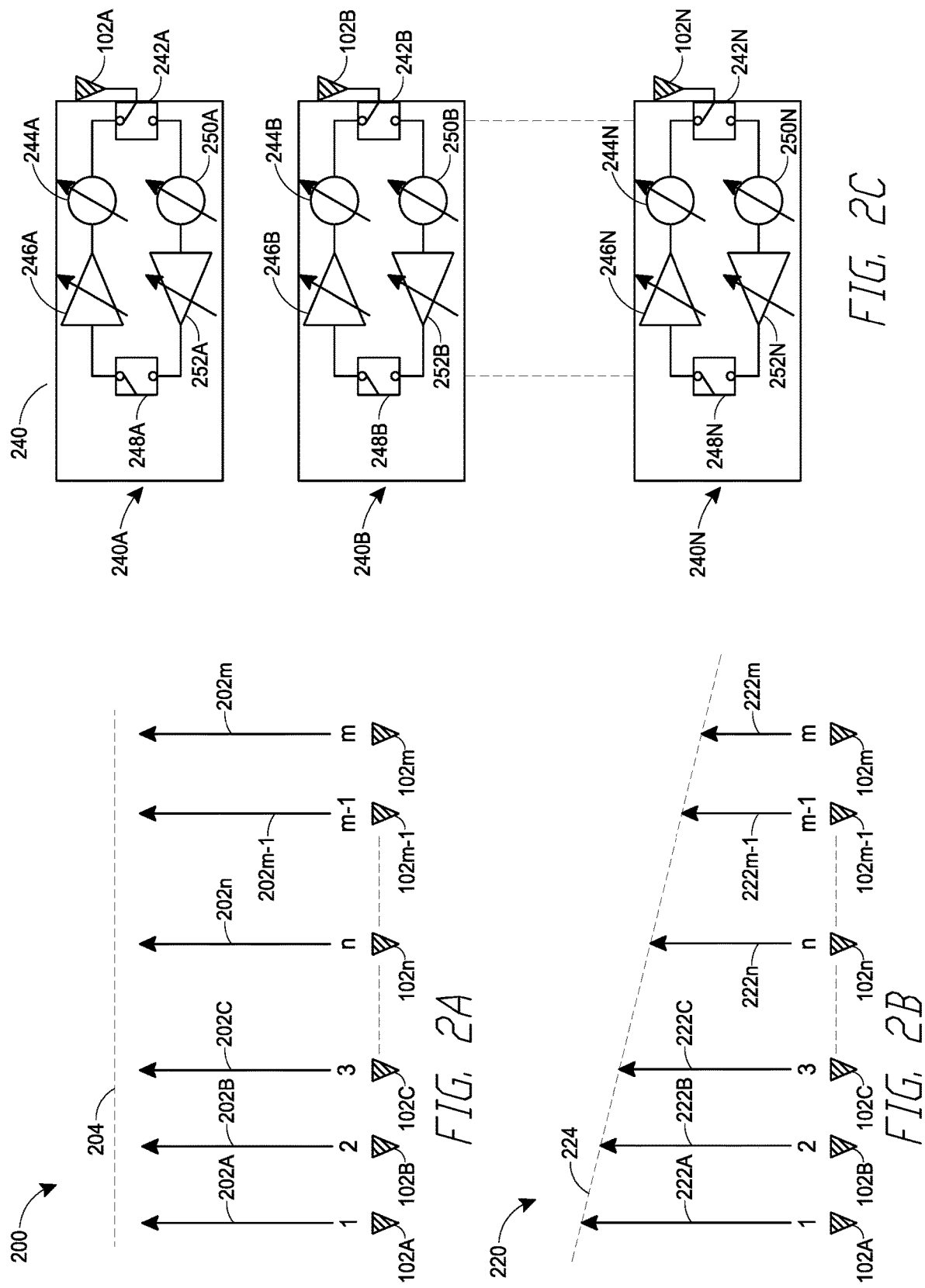

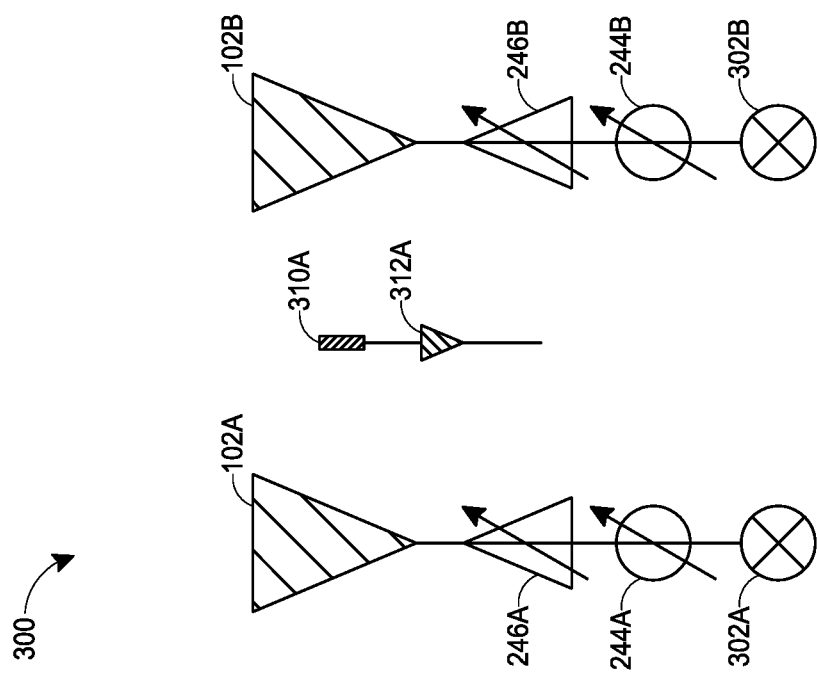

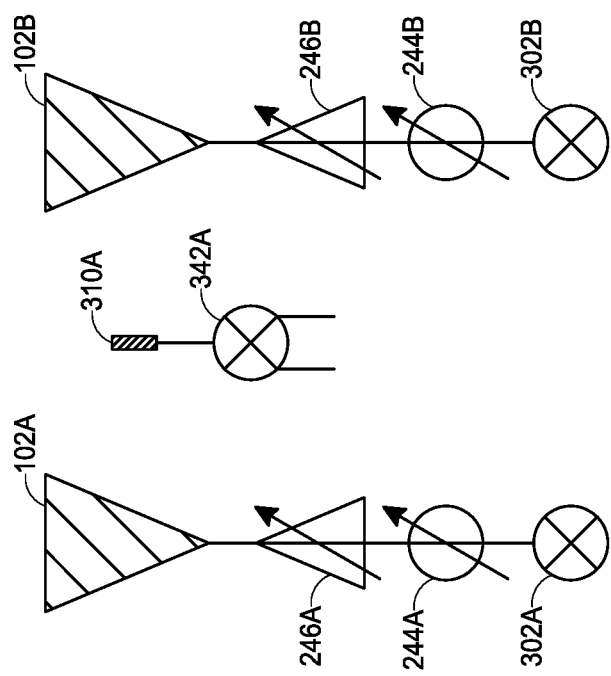

FIG.9

ANTENNA ARRAY CALIBRATION SYSTEMS AND METHODS

CROSS REFERENCE TO RELATED APPLICATION

This application is related to U.S. patent application Ser. No. 15/611,289, filed Jun. 1, 2017, titled "SYSTEMS AND METHODS FOR ARRAY CALIBRATION," the disclosure of which is hereby incorporated by reference herein in its entirety.

FIELD OF THE DISCLOSURE

The present disclosure relates to an antenna array and calibration of the antenna array.

BACKGROUND

An antenna with a single antenna element will typically broadcast a radiation pattern that radiates equally in all directions in a spherical wavefront. Phased antenna arrays generally refer to a collection of antenna elements that are used to focus electromagnetic energy in a particular direction creating a main beam. Phased antenna arrays are being used more frequently in a myriad of different applications, such as in military applications, mobile technology, on airplane radar technology, automotive radars, cellular telephone and data, and Wi-Fi technology.

The individual antenna elements of a phased-antenna array may radiate in a spherical pattern, but collectively generate a wavefront in a particular direction through constructive and destructive interference. The relative phases of the signal transmitted at each antenna element can be either fixed or adjusted, allowing the antenna system to steer the wavefront in different directions. A phased-antenna array typically includes an oscillator, a plurality of antenna elements, a phase adjuster or shifter, a variable gain amplifier, a receiver, and a control processor. A phased antenna array system uses phase adjusters or shifters to control the phase of the signal transmitted by an antenna element. The radiated patterns of the antenna elements constructively interfere in a particular direction creating a wavefront in that direction called the main beam. The phased array can realize increased gain and improve signal to interference plus noise ratio in the direction of the main beam. The radiation pattern destructively interferes in several other directions other than the direction of the main beam, and can reduce gain in those directions.

The amplitude of the signals emanating from the antenna elements affects the side lobe levels, where the side lobes are lobes of the radiation pattern that are not in the direction of the main lobe. It is generally preferable to reduce side lobe levels such that the antenna system can focus the readings from the radiation pattern to a particular desired direction. As such, the precision of the relative phase and amplitude between the elements determine the precision of the beam direction and the side lobe levels, respectively. Thus, the accuracy of the control in phase shift and amplitude for the collection of antenna elements is important to the implementation of the phased array.

SUMMARY OF THE DISCLOSURE

The innovations described in the claims each have several aspects, no single one of which is solely responsible for the desirable attributes. Without limiting the scope of the claims, some prominent features of this disclosure will now be briefly described.

Some embodiments include an active antenna apparatus with relative calibration for calibrating antenna elements, the active antenna apparatus comprising: antenna elements comprising a first antenna element, a second antenna element, and a third antenna element, wherein the second antenna element is disposed substantially equidistant to the first antenna element and the third antenna element; a probe disposed substantially equidistant to the first and second antenna elements; and calibration circuitry configured to: identify a first relative relationship between the first antenna element and the second antenna element based on observations of one or more probe signals propagating between (i) the probe and the first antenna element and (ii) the probe and second antenna element; identify a second relative relationship between the first antenna element and the third antenna element using one or more antenna signals propagating between (i) the second antenna element and the first antenna element and (ii) the second antenna element and third antenna element; and determine calibration information for calibrating one or more of the antenna elements based on the first relative relationship and the second relative relationship.

In some embodiments, the active antenna apparatus further comprises a second probe disposed substantially equidistant to the first antenna element and a fourth antenna element.

In some embodiments, the calibration circuitry is further configured to: identify a third relative relationship between the first antenna element and the fourth antenna element based on observations of one or more second probe signal propagating between (i) the second probe and the first antenna element and (ii) the second probe and fourth antenna elements, wherein the calibration circuit is configured to determine the calibration information based on the third relative relationship.

In some embodiments, the calibration circuitry is further configured to determine a fourth relative relationship between a fifth antenna element and a sixth antenna element based on observations of signals of the fifth antenna element and the sixth antenna element propagating simultaneously.

In some embodiments, to determine the calibration information includes determining at least one of a relative amplitude relationship or a relative phase relationship among the first, the second, and the third antenna elements.

In some embodiments, a chip comprises the antenna elements and the chip has two or fewer probe input/outputs.

In some embodiments, the active antenna apparatus further comprises beamforming circuitry and upconverter/downconverter circuitry in a signal path between the antenna elements and the calibration circuitry.

In some embodiments, the active antenna apparatus further comprises a coupler and a switch configured to apply a signal from a mixer of the upconverter/downconverter circuitry to the probe.

In some embodiments, the active antenna system is configured to transmit the probe signal from the probe and receive the probe signal at the first antenna element, wherein the calibration circuitry is configured to identify the first relative relationship based on the probe signal received at the first antenna element.

Some embodiments include an electronically-implemented method of an antenna element calibration using relative calibration relationships to calibrate antenna elements, the method comprising: determining, using calibration circuitry, a first relative relationship between a first antenna element and a second antenna element based on a probe signal applied by a probe, wherein the probe is disposed substantially equidistant to the first antenna element and the second antenna element; determining, using the calibration circuitry, a second relative relationship between the first antenna element and a third antenna element based on an antenna element signal applied by the second antenna element, wherein the second antenna element is disposed substantially equidistant to the first antenna element and the third antenna element; and storing calibration information for calibrating one or more of the antenna elements based on the first relative relationship and the second relative relationship.

In some embodiments, the method further comprises determining a third relative relationship between the first antenna element and a fourth antenna element based on a radio frequency signal propagating between the first antenna element and another antenna element from a different antenna element array.

In some embodiments, the method further comprises adjusting a programmable gain amplifier of a beamformer based on the calibration information, wherein the beamformer is coupleable to at least one of the first antenna element, the second antenna element, or the third antenna element.

In some embodiments, the method further comprises adjusting a phase shifter of a beamformer based on the calibration information, wherein the beamformer is coupleable to at least one of the first antenna element, the second antenna element, or the third antenna element.

In some embodiments, the method further comprises controlling one or more switches to electrically connect the probe to a receive path.

In some embodiments, the method further comprises controlling one or more switches to electrically connect the probe to a transmit path.

Some embodiments include an active antenna apparatus with relative antenna element calibration, the active antenna apparatus comprising: an active antenna array chip comprising: an antenna array comprising N×M antenna elements, wherein N is a first positive integer and M is a second positive integer, wherein the antenna elements comprise a first antenna element and a second antenna element; and a probe disposed substantially equidistant to the first antenna element and the second antenna element; wherein the active antenna array chip has less than $(N-1)*(M-1)$ probe input/outputs; up-converter circuitry; down-converter circuitry; beamforming circuitry, wherein each antenna element of the antenna elements is electrically connectable to the down-converter circuitry and the up-converter circuitry by way of the beamforming circuitry.

In some embodiments, the active antenna apparatus further comprises calibration circuitry configured to: determine calibration information for the first and second antenna elements based on observations of a first probe signal propagating between the first antenna element and the probe and a second probe signal propagating between the second antenna element and the probe; and determine calibration information for the first and third antenna elements based on observations of a first antenna signal propagating between the first antenna element and the second antenna element and a second antenna signal propagating between the second antenna element and the third antenna element.

In some embodiments, the hardware calibration circuitry is included in a digital signal processor of the active antenna apparatus.

In some embodiments, the active antenna array chip has 2 or fewer probe input/outputs.

In some embodiments, N is equal to M.

In some embodiments, the upconverter circuitry comprises a mixer, and the active antenna apparatus further comprising a coupler and a switch together configured to apply a signal from the mixer to the probe.

For the purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate specific embodiments and are not intended to be limiting.

FIG. 2A is an illustration of a horizontal wavefront according to an embodiment.

FIG. 2B is an illustration of an angled wavefront according to an embodiment.

FIG. 2C is a schematic block diagram of a series of transceivers according to an embodiment.

FIG. 3A is a schematic block diagram of a probe with a power detector disposed between two antenna elements according to an embodiment.

FIG. 3C is a schematic block diagram of a probe with a mixer disposed between two antenna elements according to an embodiment.

FIG. 9 illustrates an 8×8 antenna array with one probe for calibration according to an embodiment.

DETAILED DESCRIPTION

Figure 1A:
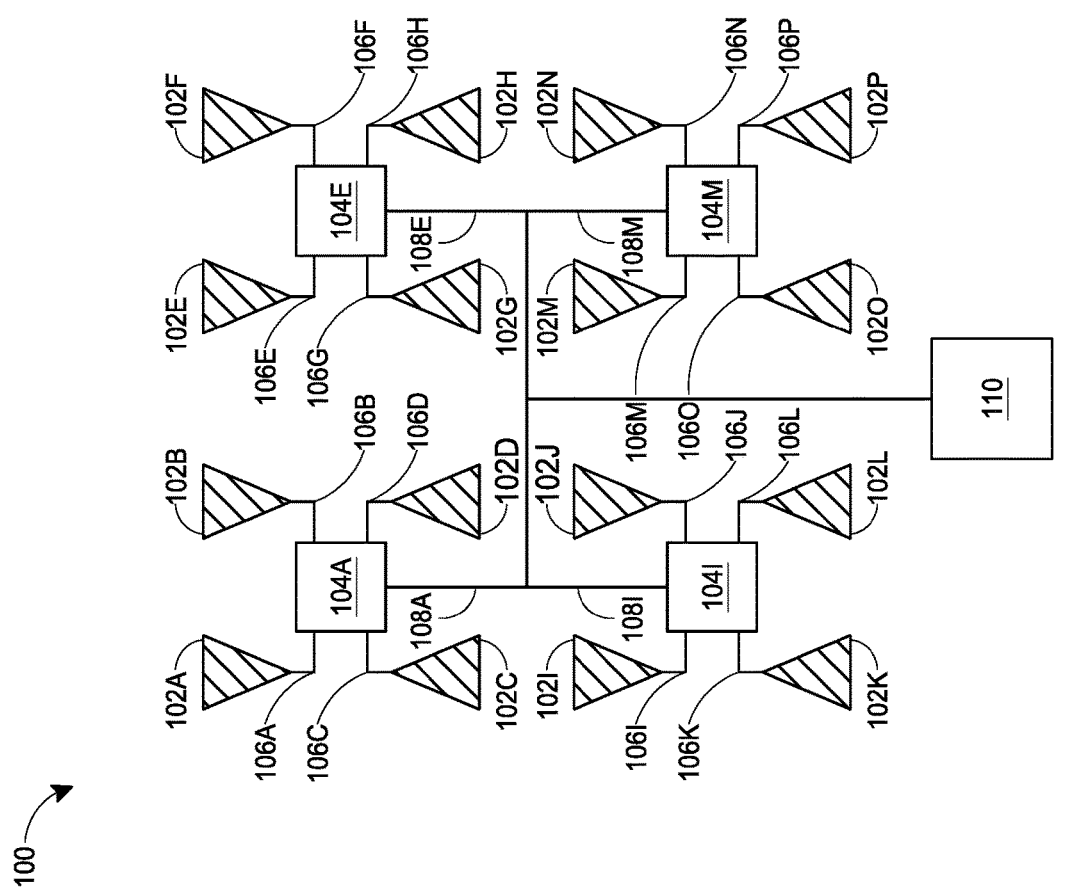
FIG. 1A is a schematic block diagram of a symmetric routing schematic for a 4-by-4 antenna array according to an embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the meaning or scope of the claims.

An antenna array can enable a beamformer to steer an electromagnetic radiation pattern in a particular direction, which generates a main beam in that direction and side lobes in other directions. The main beam of the radiation pattern is generated based on constructive inference of the signals based on the transmitted signals' phases. Furthermore, the amplitudes of the antenna elements determine side-lobe levels. A beamformer can generate desired antenna patterns by, for example, providing phase shifter settings for the antenna elements. However, over time, the amplitudes of signals and the relative phases among the antenna elements can drift from the values set when the antenna was originally calibrated. The drift can cause the antenna pattern to degrade, which can, for example, reduce the gain in a main lobe. Thus, what is needed is a way to accurately measure and control the phase and amplitude of antenna elements in an array system even after an antenna array has been fielded.

Furthermore, the calibration process itself can be relatively labor intensive, time consuming, and costly. Thus, there is a need for a method of calibration without the need for expensive test equipment and facilities and having to relocate the antenna to a particular location. These disclosed techniques are also applicable to the manufacturing test environment and can be used to speed production, thus lowering costs. In one embodiment, the calibration data is used by the beamformer and combined with other data, such as pre-calculated or pre-stored antenna pattern data, to generate appropriate settings for beamforming.

The present disclosure enables an antenna array to perform calibration using relative measurements of phase and/or absolute measurements of amplitude. A probe is placed between antenna elements and the phase and/or amplitude of the antenna elements are measured. Then, the phase or amplitude can be assessed to determine adjustments that are made to the transmitter, receiver, or transceiver connected to the antenna elements. In some embodiments, the antenna elements can transmit signals, and the phase of one or more antenna elements can be adjusted until a relatively high or maximum and/or relatively low or minimum power level is reached. Upon determining a relatively high or maximum power level, the phase adjuster or shifter values are recorded as those corresponding to in phase, and for a relatively low or minimum power level, the phase values are recorded as 180 degrees out of phase. Although embodiments describe the use of a probe, it is appreciated that other structures (e.g. conductors) that can transmit and/or receive signals may also be used (e.g. slots, monopole, small patches, other coupling structures, etc.).

In some embodiments, the probe should be disposed symmetrically between the antenna elements. For example, if there are two antenna elements, the probe can be placed in between the two antenna elements. In another example, if there are four antenna elements, the probe can be placed diagonally between the four antenna elements equidistant from each of the four antenna elements. Placing the probe symmetrically between antenna elements reduces or eliminates the possible variation that may occur in the propagation of the radiation pattern to or from the probe and the antenna elements.

In some embodiments, the antenna elements can be used to transmit signals to the probe, the probe receiving the transmitted signals. The probe can detect power (e.g. by using a power detector) or detect both power and phase (e.g. by using a mixer). Alternatively, the probe can be used as a transmitter, transmitting a signal to the antenna elements, where the antenna elements receive the transmitted signal.

Using a single probe to calibrate multiple antennas is advantageous. Having a single probe that may be used to transmit to the antenna elements and/or receive signals from antenna elements may itself introduce variation to the signal. However, since the same probe and components connected to the probe (e.g., a mixer) are used to measure the signal, there is advantageously no part-to-part or channel-to-channel variation with the disclosed techniques. For example, the probe and the components connected to the probe will introduce the same variation to a signal received at the probe from a first and second antenna element.

By contrast, couplers used to measure phase and amplitude of a signal to calibrate antenna elements would introduce variation. A separate coupler would be connected to the transmit path of each antenna element. Then, the signal would travel along the signal route to components connected to each coupler. The routing path from each coupler to their associated connected components would introduce channel to channel variation. Each coupler may be connected to its own set of components, which despite possibly being of the same kind of components, the components themselves introduce part to part variability. Furthermore, the couplers themselves use additional hardware such as switches. The couplers themselves, often made of metallic substances, may interfere with the radiation signal making it harder to obtain higher isolation between the antenna elements. These drawbacks are reduced or eliminated by embodiments of the invention.

Embodiments of the present disclosure including using a probe disposed between antenna elements are advantageous in that the probes can be used to calibrate the array based on near field radiation measurements. Thus, the array can be calibrated without the need for far field measurements. Typically, electromagnetic anechoic chambers, (also called echo-free chambers) can be used to simulate an open space situation. The time and space in these chambers may be difficult to schedule, may be expensive, and time consuming. However, embodiments of the present disclosure avoid the need of having to place the antenna in an anechoic chamber because near-field measurements are used instead of far-field measurements. Furthermore, anechoic chambers may be practical for initial calibration, but not for later calibration. Some embodiments of the antenna array of the present disclosure may be calibrated repeatedly and at the field. The probes can be permanently placed in between antenna elements. The antenna array may be configured to allow temporary installment of the probes in between the antenna elements as well. Some embodiments of the near-field calibration of the present disclosure may also be helpful for small signal difference.

The calibration method and system can be used to calibrate arrays of different sizes. For example, the system can calibrate a planar array by calibrating a first set of antenna elements (or calibration group) that are equidistant to one probe, then calibrating a second set of antenna elements equidistant to another probe where the first and second set of antenna elements share at least one antenna element. Then, the shared antenna element can be used as a reference point to calibrate the other antenna elements.

Although the disclosure may discuss certain embodiments with the probe as the receiver and the antenna elements as the transmitter, it is understood that the probe can act as a transmitter and the antenna elements as a receiver, and vice versa.

FIG. 1A is a schematic block diagram of a symmetric routing schematic 100 according to an embodiment. The symmetric routing schematic 100 includes antenna elements, 102A, 102B, 102C, 102N, 102E, 102F, 102G, 102H, 102I, 102J, 102K, 102L, 102M, 102N, 102O, and 102P (collectively referred to herein as 102). The symmetric routing schematic 100 also includes a chip 104A, 104E, 104I, and 104M (collectively referred to herein as 104). The symmetric routing schematic 100 includes a transceiver 110 and routing paths 106A, 106B, 106C, 106D, 106E, 106F, 106G, 106H, 106I, 106J, 106K, 106L, 106M, 106N, 106O, 106P, 108A, 108E, 108I, and 108M (collectively referred to herein as 106) from the transceiver 110 to the antenna elements 102.

FIG. 1A refers to a symmetric routing schematic 100 for a 4-by-4 antenna array. The schematic refers to symmetric routing because the routes on the routing paths 106 from the transceiver 110 to the antenna elements 102 are of the same distance. For example, the routing path from transceiver 110 to antenna element 102A is a combination of the routing paths 108A and 106A, while the routing path from transceiver 110 to antenna element 102B is a combination of the routing paths 108A and 106B. The routing paths are generated to minimize variation in the distance the signal travels from the transceiver 110 to the antenna element 102. This type of configuration helps to mitigate the variation that may cause difficulties in calibration due to different lengths of routing paths the signal travels from the transceiver 110 to the antenna element 102.

The antenna elements 102 may be radiating elements or passive elements. For example, the antenna elements 102 may include dipoles, open-ended waveguides, slotted waveguides, microstrip antennas, and the like. Although some embodiments illustrate a certain number of antenna elements 102, it is appreciated that the some embodiments may be implemented on an array of two or more antenna elements.

Figure 1B:
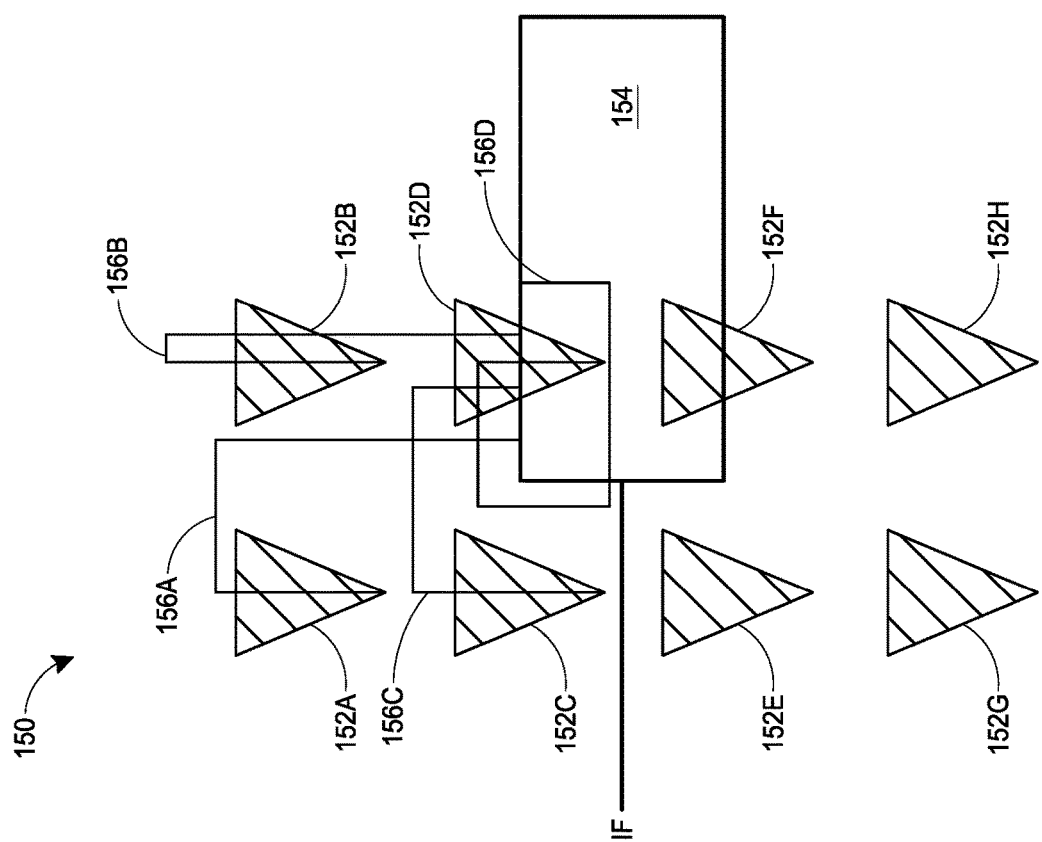
FIG. 1B is a schematic block diagram of an asymmetric routing schematic for a 2-by-8 antenna array according to another embodiment.

FIG. 1B is a schematic block diagram of an asymmetric routing schematic 150 for a 2-by-4 antenna array according to another embodiment. The asymmetric routing schematic 150 includes antenna elements 152A, 152B, 152C, 152D, 152E, 152F, 152G, and 152H (collectively referred to herein as 152). The asymmetric routing schematic 150 also includes a chip 154. The asymmetric routing schematic 150 includes routing paths 156A, 156B, 156C, and 156D (collectively referred to herein as 156) from the chip 154 to the antenna elements 152. FIG. 1B is directed to asymmetric routing because the routing paths 156 from the chip 154 to the antenna elements 152 are different in lengths. Thus, the phase and amplitude varies differently from channel to channel. For example, the transmitted signal at the antenna element 152 may be different from element to element even though the same signal was transmitted from the chip 154. In some embodiments, the received signal at the antenna elements 152 may be the same, but different when received at the chip 154 as a result of the different lengths of the routing paths 156.

FIG. 2A is an illustration of a horizontal wavefront 200 according to an embodiment. Each antenna element 102 may radiate in a spherical radiation pattern. However, the radiation patterns collectively generate a horizontal wavefront 204. The illustration 200 includes antenna elements 102A, 102B, 102C, 102N, 102M-1 and 102M. The antenna elements 102A, 102B, 102C, and 102N may be arranged linearly, where the elements are arranged on a straight line in a single dimension. In this configuration, the beam may be steered in one plane. The antenna elements may also be arranged planarly, arranged on a plane in two dimensions (N direction and M direction). In this planar configuration, the beam may be steered in two planes. The antenna elements may also be distributed on a non-planar surface. The planar array may be rectangular, square, circular, or the like. It is appreciated that the antenna may be arranged in other configurations, shapes, dimensions, sizes, types, other systems that can implement an antenna array, and the like. The illustration of the horizontal wavefront 200 shows each of the antenna elements 102 transmitting a signal 202A, 202B, 202C, 202N, 202M-1, and 202M (collectively referred to herein as 202) creating a horizontal wavefront 204. The illustration of FIG. 2A illustrates an antenna array creating a main beam that points upward, as shown by the horizontal wavefront 204. The phases from the antenna elements 102 are constructively interfering in the upward direction.

FIG. 2B is an illustration of an angled wavefront 220 according to an embodiment. The illustration of the angled wavefront 220 includes antenna elements 102A, 102B, 102C, 102N, 102M-1 and 102M. The antenna elements may be arranged similarly to that described for FIG. 2A. The illustration of an angled wavefront 220 shows the antenna elements 102 transmitting a signal 222A, 222B, 222C, 222N, 222M−1, and 222M (collectively referred to herein as 222) creating a wavefront 224 that propagates at an angle, different from the direction of the wavefront 204 in FIG. 2A. The phases of the signals 222 are constructively interfering in the direction that the angled wavefront 220 is traveling (e.g. up-right direction). Here, each of the phases of the antenna elements 102 may be shifted by the same degree to constructively interfere in a particular direction.

The antenna elements 102 can be spaced apart equidistant from one another. In some embodiments, the antenna elements 102 are spaced at different distances from each other, but with a probe equidistant from at least two antenna elements 102.

Although the disclosure may discuss certain embodiments as one type of antenna array, it is understood that the embodiments may be implemented on different types of antenna arrays, such as time domain beamformers, frequency domain beamformers, dynamic antenna arrays, active antenna arrays, passive antenna arrays, and the like.

FIG. 2C is a schematic block diagram of a series of transceivers 240A, 240B, 240N (collectively referred to herein as 240) according to an embodiment. In some embodiments, a single transceiver 240 feeds to a single antenna element 102. However, it is appreciated that a single transceiver 240 may feed to multiple antenna elements 102, or a single antenna element 102 may be connected to a plurality of transceivers 240. Furthermore, it is appreciated that the antenna element 102 may be linked to a receiver and/or a transmitter.

In some embodiments, the transceiver 240 may include a switch 242A, 242B, 242N (collectively referred to herein as 242) to switch the path from the antenna element 102 to the receiver or the transmitter path. The transceiver 240 includes another switch 248A, 248B, 248N (collectively referred to herein as 248) that switches the path from the signal processor (not shown) to the receiver or the transmitter path. The transmitter path has a phase adjuster 244A, 244B, 244N (collectively referred to herein as 244) and a variable gain amplifier 246A, 246B, 246N (collectively referred to herein as 246). The phase adjuster 244 adjusts the phase of the transmitted signal at the antenna element 102 and the variable gain amplifier 246 adjusts the amplitude of the transmitted signal at the antenna element 102. Although the embodiments describe the transceiver 240 including a phase adjuster 244 and a variable gain amplifier 246, other components can be used to adjust the magnitude of the signal and/or the phase of the signal. Furthermore, although a switch is shown to switch from the transmitter path to the receive path, other components can be used, such as a duplexer.

The receiver path may also have a phase adjuster 250A, 250B, 250N (collectively referred to herein as 250), and a variable gain amplifier 252A, 252B, 252N (collectively referred to herein as 252). The phase adjuster 250 and the variable gain amplifier 252 can be used to adjust the received signal from the antenna element 102 before going to the signal processor (not shown).

Figure 2D:
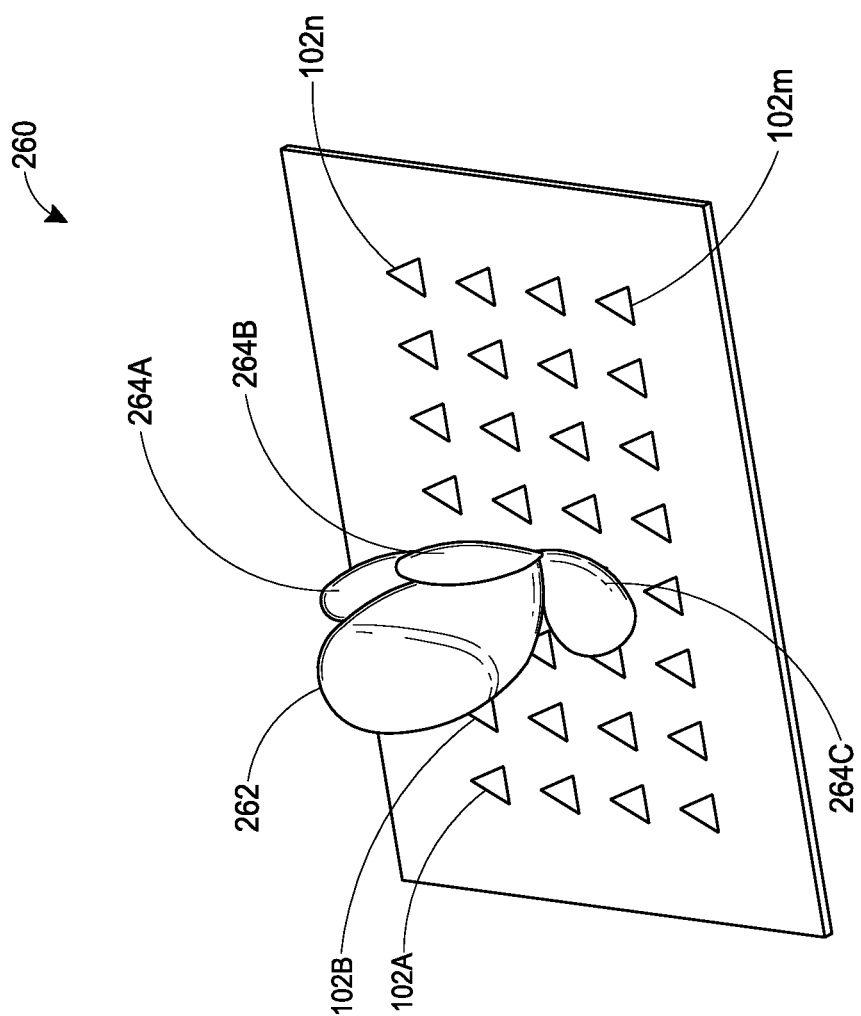
FIG. 2D is an illustration of a planar array and an associated electromagnetic pattern according to an embodiment.

FIG. 2D is an illustration of a planar phased array 260 and an associated electromagnetic pattern according to an embodiment. FIG. 2D includes antenna elements 102A, 102B, 102N, 102M−1, and 102M. FIG. 2D also includes a beam pattern with a main beam 262, and side lobes 264A, 264B, 264C. The antenna elements 102 are transmitting a signal where the phase of the signal is constructively interfering in the direction of the main beam 262. The precision of the amplitude of the antenna elements 102 controls the side-lobe levels. For example, the more uniform the amplitudes of the transmitted signals from the antenna elements 102 are, the lower the side lobe levels will be. The antenna elements 102 may be disposed on a single die, or multiple dies.

FIG. 3A is a schematic block diagram 300 of a probe 310A with a power detector 312A disposed between two antenna elements 102A, 102B according to an embodiment. In this block diagram 300, the probe is disposed equidistant between the two antenna elements 102A, 102B. The probe 310A may be a slot, a probe, a coupling element, any component that can be used to detect signals, or the like. The probe can be used as a transmitter.

Figures 1, 3B:
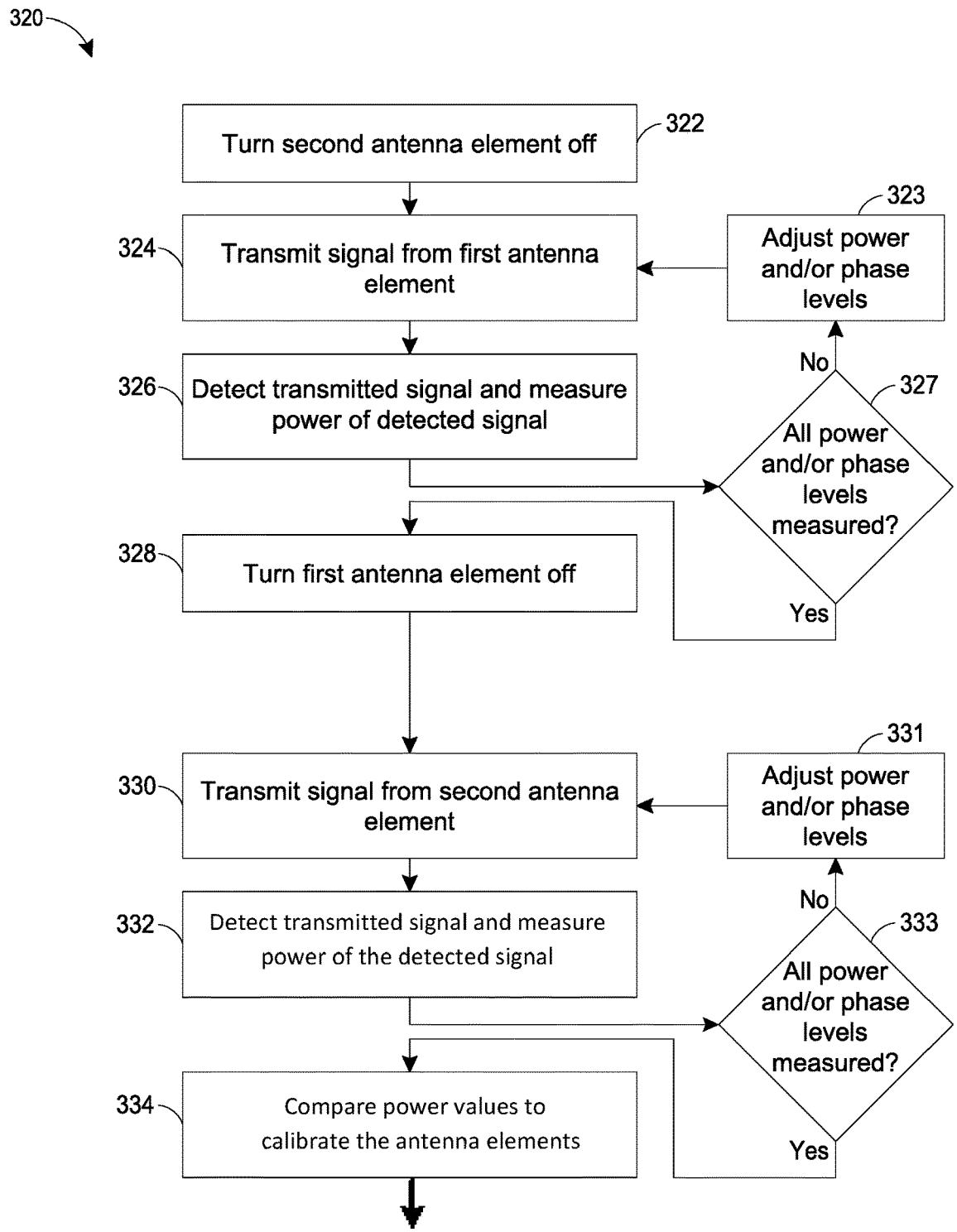
FIGS. 3B-1 and 3B-2 are flow diagrams for calibration using a probe with a power detector disposed between two antenna elements according to an embodiment.
Figures 2, 3B:
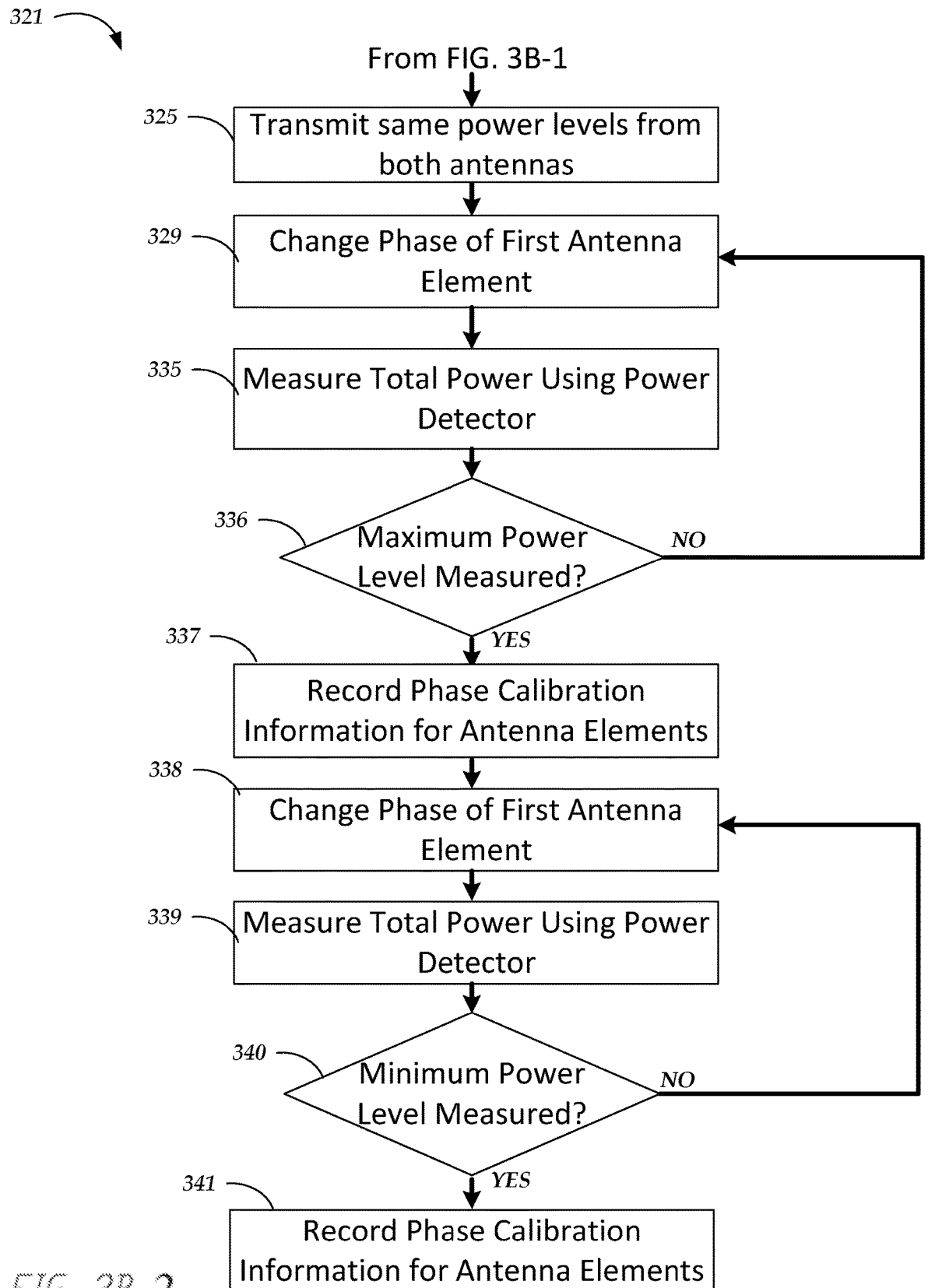

FIGS. 3B-1 and 3B-2 is a flow diagram for calibration using a probe with a power detector disposed between two antenna elements according to an embodiment.

FIG. 3B-1 illustrates a flow diagram 320 for measuring and comparing all power levels for the two antenna elements 102A, 102B. At block 322, the transmitter tied to the antenna element 102B is turned off. At block 324, a signal is transmitted from the first antenna element 102A. A signal is generated from the mixer 302A, amplified by the variable gain amplifier 246A, shifted in phase by the phase adjuster 244A, and transmitted from the antenna element 102A. At block 326, the probe 310A detects the transmitted signal from the antenna element 102A and the power detector 312A detects power values of the detected signal. At block 327, the system can determine whether all power and/or phase levels are measured. If yes, then the system can continue to block 328. If not, then the power and/or phase can be adjusted in block 323, and proceed back to block 324. For example, a combination of each power level and each phase level can be measured. In some embodiments, the phase and amplitude are decoupled such that each power level can be measured and each phase level measured independently without having to measure every combination of each power level and each phase level.

At block 328, the transmitter tied to the antenna element 102A is turned off. At block 330, a signal is transmitted from the second antenna element 102B. A signal is generated from the mixer 302B, amplified by the variable gain amplifier 246B, shifted in phase by the phase adjuster 244B, and transmitted from the antenna element 102B. At block 332, the probe 310A detects the transmitted signal from the antenna element 102B and the power detector 312A detects power values of the detected signal.

At block 334, once the detected signals from the transmitted signals of antenna elements 102A and 102B are stored, the power values are compared to calibrate the transmitter connected to the antenna element 102A relative to the transmitter connected to the antenna element 102B, and/or vice versa. The power values are calibrated by adjusting the gain of the variable gain amplifier 246A and/or 246B. In some embodiments, the calibration is performed during, before, or after other blocks in FIG. 3B. After comparing power values to calibrate the antenna elements at block 334, the flow can continue to FIG. 3B-2.

FIG. 3B-2 illustrates a flow diagram 321 for calibrating the phase for the two antenna elements 102A, 102B. At block 325, a signal of the same power level is transmitted from both antenna elements 102A, 102B. This can be achieved using data obtained from the steps in FIG. 3B-1. At block 329, the phase of the first antenna element 102A is changed. Then at block 335, the total power can be measured by a power detector 312A. The system determines whether the maximum power level is measured at block 336. If not, then the system continues to change the phase of the first antenna element 102A and continues the flow diagram from block 329. If the maximum power level is measured at block 336, then the phase can be determined to be in an in-phase condition. The phases that provide the maximum power level at block 336 is recorded for the antenna elements at block 337.

At block 338, the phase of the first antenna element 102A is changed, and at block 339, the total power is measured using the power detector 312A. At block 340, the system determines whether the minimum power level is measured. If not, then the phase of the first antenna element 102A is changed and the flowchart continues from block 338. If the minimum power level is measured, then the system records the phase calibration information for the antenna elements at block 341. This can be considered a 180 degrees out of phase condition.

FIG. 3C is a schematic block diagram 330 of a probe 310A with a mixer 342A disposed between two antenna elements 102A, 102B according to an embodiment. The probe 310A may be disposed equidistant from the antenna elements 102A and 102B. The probe 310A is connected to the mixer 342A.

Figure 3D:
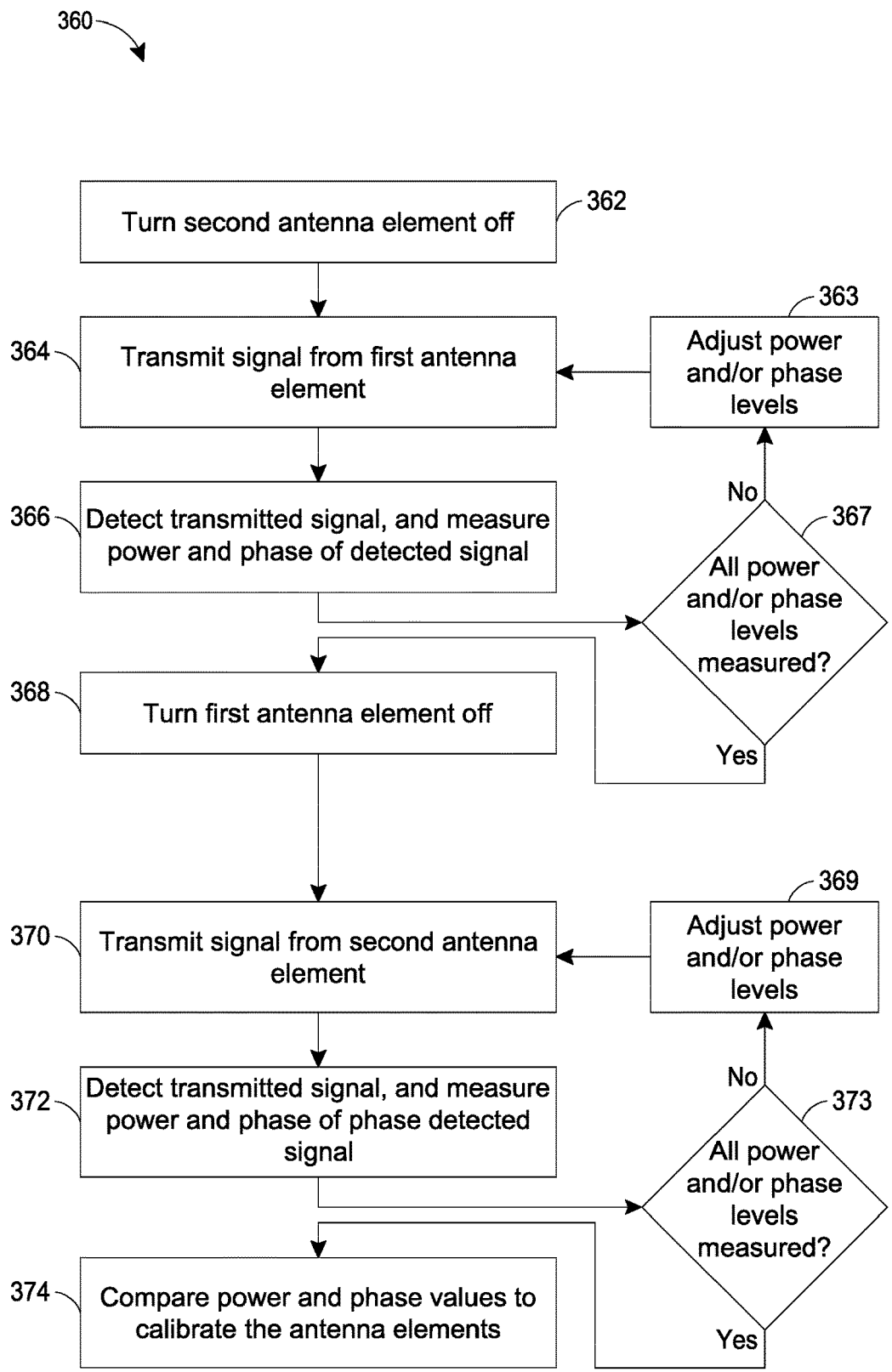
FIG. 3D is a flow diagram for calibration using a probe with a mixer disposed between two antenna elements according to an embodiment.

FIG. 3D is a flow diagram 360 for calibration using a probe with a mixer disposed between two antenna elements according to an embodiment. The mixer can be used to measure phase and/or amplitude. At block 362, the transmitter connected to antenna element 102B is turned off. At block 364, a signal is generated from the mixer 302A, amplified by the variable gain amplifier 246A, phase shifted by the phase adjuster 244A, and transmitted by the antenna element 102A. At block 366, the probe 310A detects the transmitted signal and using the mixer, the signal processor measures and records the amplitude and phase values. At block 367, the system can determine whether all power and/or phase levels have been measured. If yes, then the system can proceed to block 368. If no, then the system can adjust power and/or phase levels in block 363, and return to block 324.

At block 368, the transmitter connected to the antenna element 102A is turned off. At block 370, a signal is generated from the mixer 302B, amplified by the variable gain amplifier 246B, shifted in phase by the phase adjuster 244B, and transmitted by the antenna element 102B. At block 372, the probe 310A detects the signal, the mixer mixes the signal, and the signal processor measures and records the phase and amplitude values. At block 373, the system can determine whether all power and/or phase levels have been measured. If yes, then the system can proceed to block 374. If no, then the system can adjust power and/or phase levels in block 369, and return to block 370.

At block 374, based on a comparison between the amplitudes of the signals transmitted by the antenna element 102A and 102B, the variable gain amplifiers 246A, 246B are adjusted such that the amplitudes are calibrated to transmit substantially the same power based on the same signal generated. Furthermore, based on a correlation between the phases of the signals transmitted by the antenna element 102A and 102B, the phase adjusters 244A and 244B are adjusted such that the phases are calibrated to transmit at substantially the same phase for the same generated signal.

The values of the variable gain amplifier 246A, 246B and/or the phase adjusters 244A, 244B may be controlled using a digital command sent through the beam steering interface, such as the beam steering chip or the signal processor. The phase adjuster may be an n-bit phase adjuster providing control of the phase in a total of a particular number of phase degrees. Thus, the calibration process may be calibrated to be the state that allows for the closest phase value. In some embodiments, the calibration is performed during, before, or after other blocks in FIG. 3D.

Figure 4:
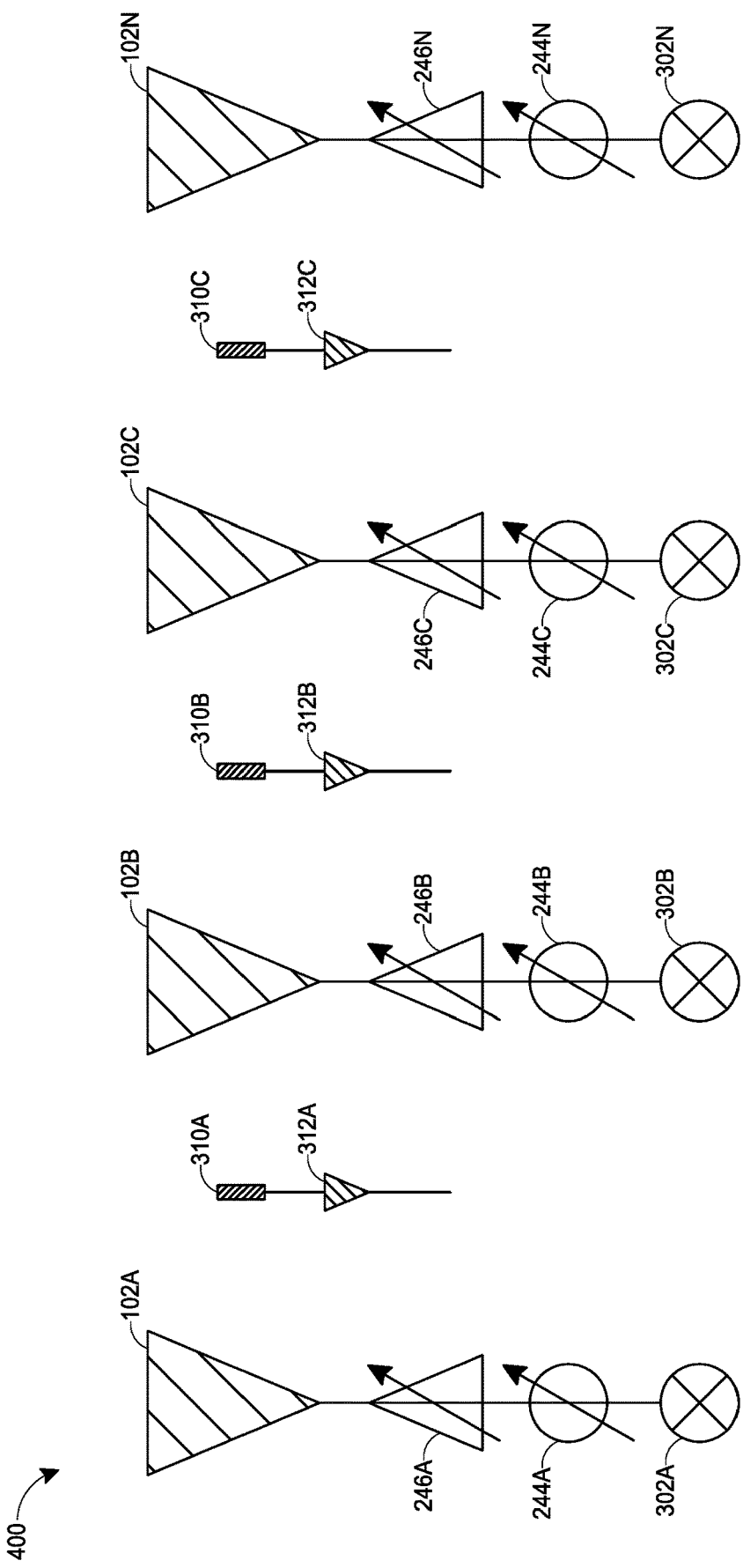
FIG. 4 is a schematic block diagram of probes disposed between four antenna elements according to an embodiment.

FIG. 4 is a schematic block diagram 400 of probes 310A, 310B, 310C disposed between four antenna elements 102A, 102B, 102C, 102N according to an embodiment. In the block diagram 400, probe 310A is disposed equidistant from antenna element 102A and antenna element 102B. The probe 310B is disposed equidistant from antenna element 102B and antenna element 102C. The probe 310C is disposed equidistant from antenna element 102C and antenna element 102N. The antenna elements 102A, 102B, 102C, and 102N are disposed linearly.

In this embodiment, antenna elements 102A and 102B are calibrated first. The transmitters connected to the antenna elements 102B, 102C, and 102N are turned off. The mixer 302A generates a signal, the signal shifted in phase by the phase adjuster 244A, the signal amplified by a variable gain amplifier 246A, and transmitted from the antenna element 102A. The probe 310A receives the signal. Next, the antenna 102B transmits a signal that the same probe 310A detects. In this embodiment, the probe 310A is connected to a power detector 312A. Antenna elements 102A and 102B are calibrated similar to the process described in FIG. 3A. However, the probe 310A may be connected to mixers and may be calibrated similar to the process described in FIG. 3B. Other ways of calibration are possible. For example, other components may be connected to the probe 310A to measure phase and/or amplitude. Furthermore, other methods of calibration may be used using relative measurements of phase and/or amplitude.

Next, antenna elements 102B and 102C are calibrated. Then, 102C and 102N are calibrated. In this embodiment, the calibration occurs serially. However, calibration may occur in different time steps. For example, when antenna element 102B is transmitting a signal to calibrate with antenna 102A, not only can probe 310A be detecting the signal, but also probe 310B may detect the signal. Thus, while antenna elements 102A and 102B are being calibrated, the calibration between antenna elements 102B and 102C can begin in parallel. In this embodiment, neighboring antenna elements are being calibrated. However, it is appreciated that any set of antenna elements that are equidistant from the probe can be calibrated. For example, the first and fourth antenna element 102A, 102N can be calibrated with a probe 310B between the second and third antenna element 102B, 102C.

Figure 5A:
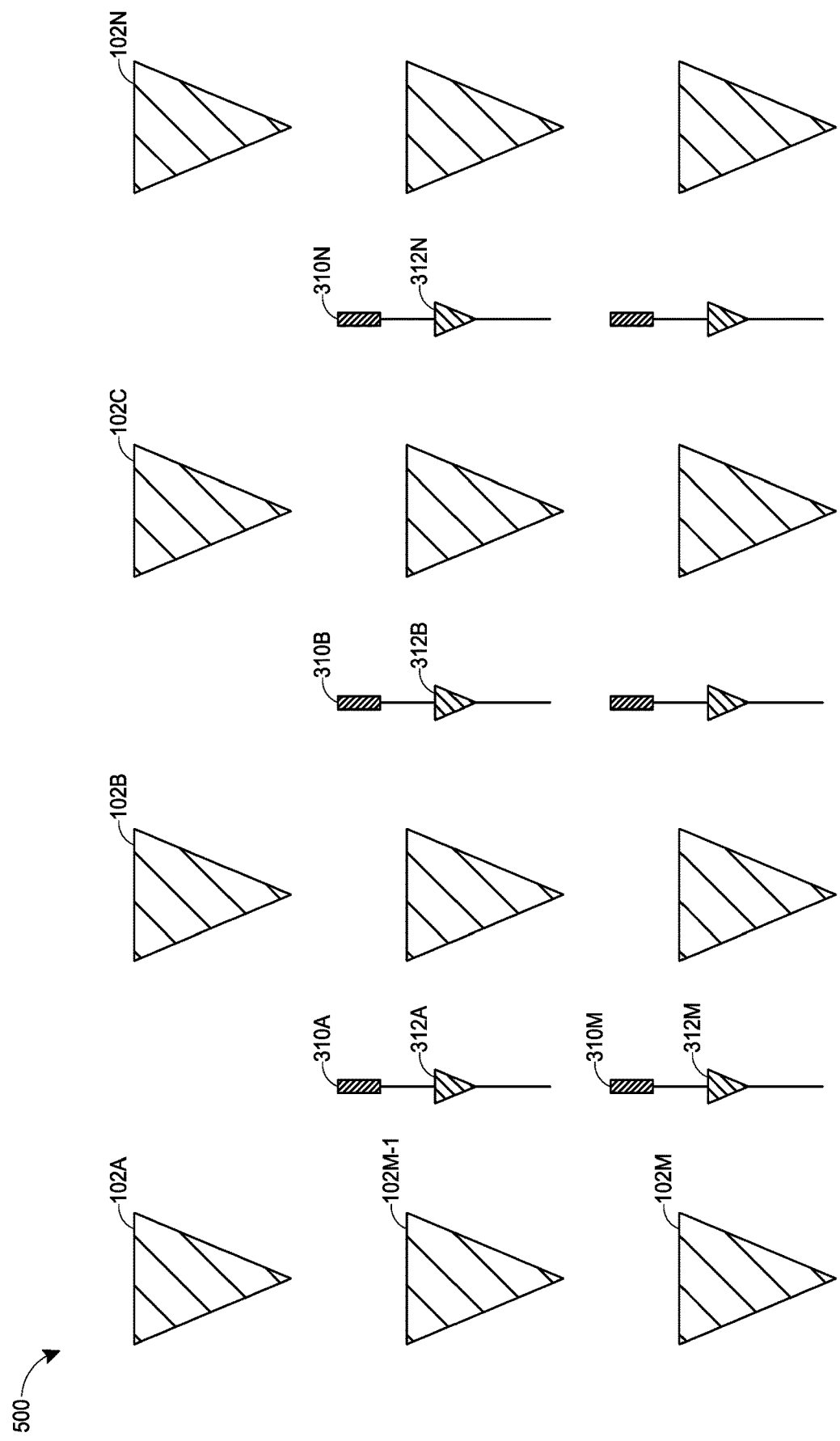
FIG. 5A is a schematic block diagram of probes disposed between an array of three by four antenna elements according to an embodiment.

FIG. 5A is a schematic block diagram of probes disposed between an array of three by four antenna elements according to an embodiment. The probes 310A, 310B, 310C . . . 310M (collectively referred to herein as 310) are disposed symmetrically between a set of four antenna elements 102. In this embodiment, the probe 310 is equidistant from each antenna element 102 in the set of four antenna elements. However, it is appreciated that the probe 310 may be placed at some distance that is equidistant from at least two antenna elements 102.

Figure 5B:
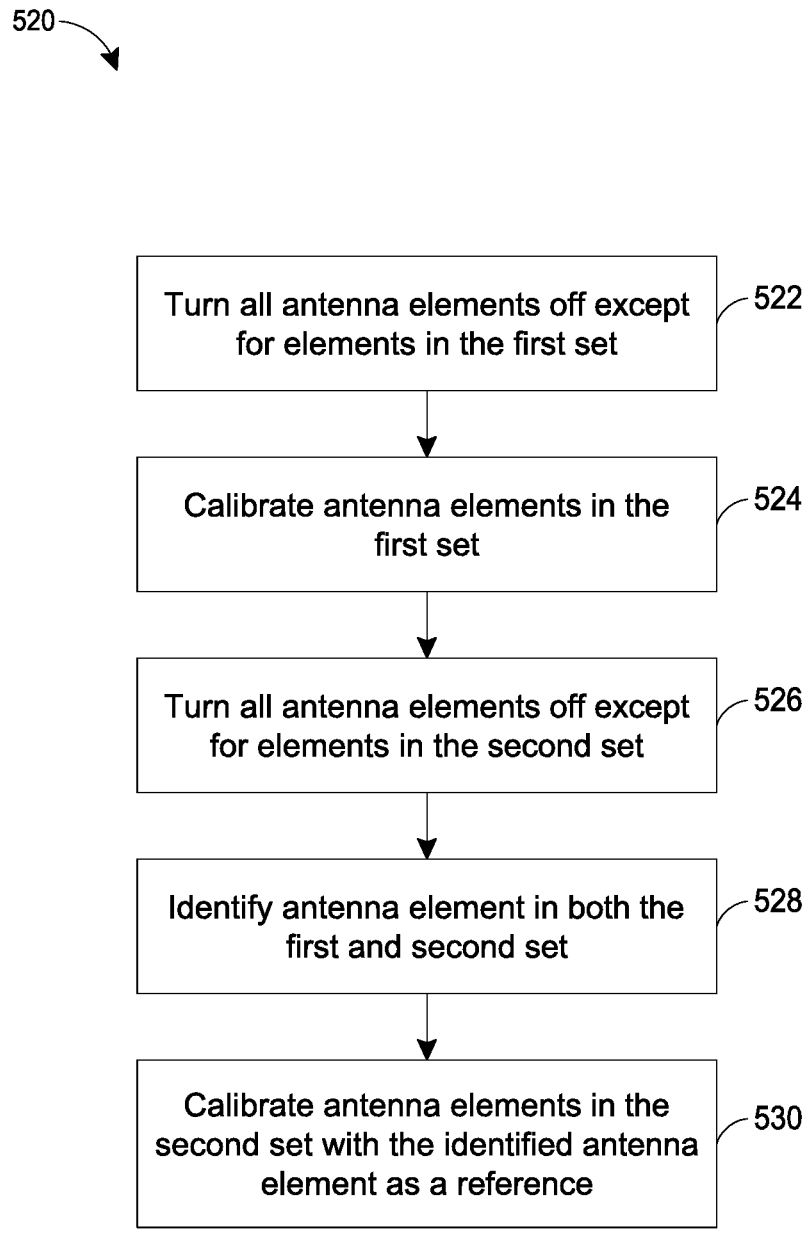
FIG. 5B is a flow diagram for calibration using probes disposed between an array of three by four antenna elements according to an embodiment.

FIG. 5B is a flow diagram for calibration using probes disposed between an array of three by four antenna elements according to an embodiment.

At block 522, all transmitters connected to all antenna elements 102 are turned off. At block 524, the first set of four antenna elements is calibrated together. Then, the first antenna element 102A transmits a signal. The probe 310A receives this signal, measures the power using the power detector 312A, and records the power. This is repeated for the other three antenna elements 102 that are equidistant from the first probe 310A. Then, the gain of each antenna element 102 within the set of four antenna elements is adjusted to be calibrated in relation to one another. Then, all four antenna elements 102 transmit a signal, the phase adjusted, and the phase recorded to identify the phase configurations that provide maximized power (e.g. the phase values are equal). The same test is performed for when the power is minimized (e.g. phases are 180 degrees apart). Calibration can be performed in a similar manner to that described in FIG. 3A, 3B, and other ways described in this disclosure.

Although the disclosure may discuss certain embodiments as calibrating four antennas at once, it is understood that the embodiments may be implemented using a different number of transmitters, antenna elements, probes, and the like. For example, the power can be calibrated for four antenna elements at once (e.g. once power is recorded for four antenna elements, the gain for each of the four antenna elements can be adjusted to meet a reference gain value), while the phase can be calibrated in pairs (e.g. calibrate antenna elements 102A and 102B first, then calibrate antenna elements 102A and 102M−1 next).

After the antenna elements 102 within the set of four antenna elements have been calibrated in reference to one another, the calibration procedure may calibrate the next set of four antenna elements 102. Antenna elements except for the antenna elements in the next set are turned off at block 526. At block 528, an antenna element that is in both the first and second set is identified. Then at block 530, the next set of antenna elements are calibrated with the identified antenna element as a reference. The next set of four antenna elements 102 may be equidistant from the next probe 310B. The same or a different calibration method may be used for the next set of four antenna elements 102. After the sets of antenna elements 102 across the row of elements are calculated, the process can be repeated for the following column of a set of four antenna elements 102. For example, after the set of antenna elements 102 have been calibrated using the probes 310A, 310B, and 310C, then the next set of four antenna elements 102 to be calibrated may be those that are equidistant from the probe 310M.

Once the power values are calibrated, the transmitter connected to the antenna element 102A and the transmitter connected to the antenna element 102B are turned on. Based on the power calibration, the antenna elements 102A and 102B transmit signals at substantially the same power level. Adjust one or both of the phase adjuster 244A or 244B. The probe 310A will receive both signals from antenna elements 102A and 102B and detect the power values at the power detector 312A. When the power is maximized, the phase adjuster 244A and 244B are aligned (e.g. the phase values are equal). When the power is minimized, the phase adjuster 244A and 244B are opposite (e.g. phase of one equals the phase of the other plus 180 degrees). Using this relative relationship, the system can calibrate the phase of one antenna element relative to the other antenna element.

Figure 6A:
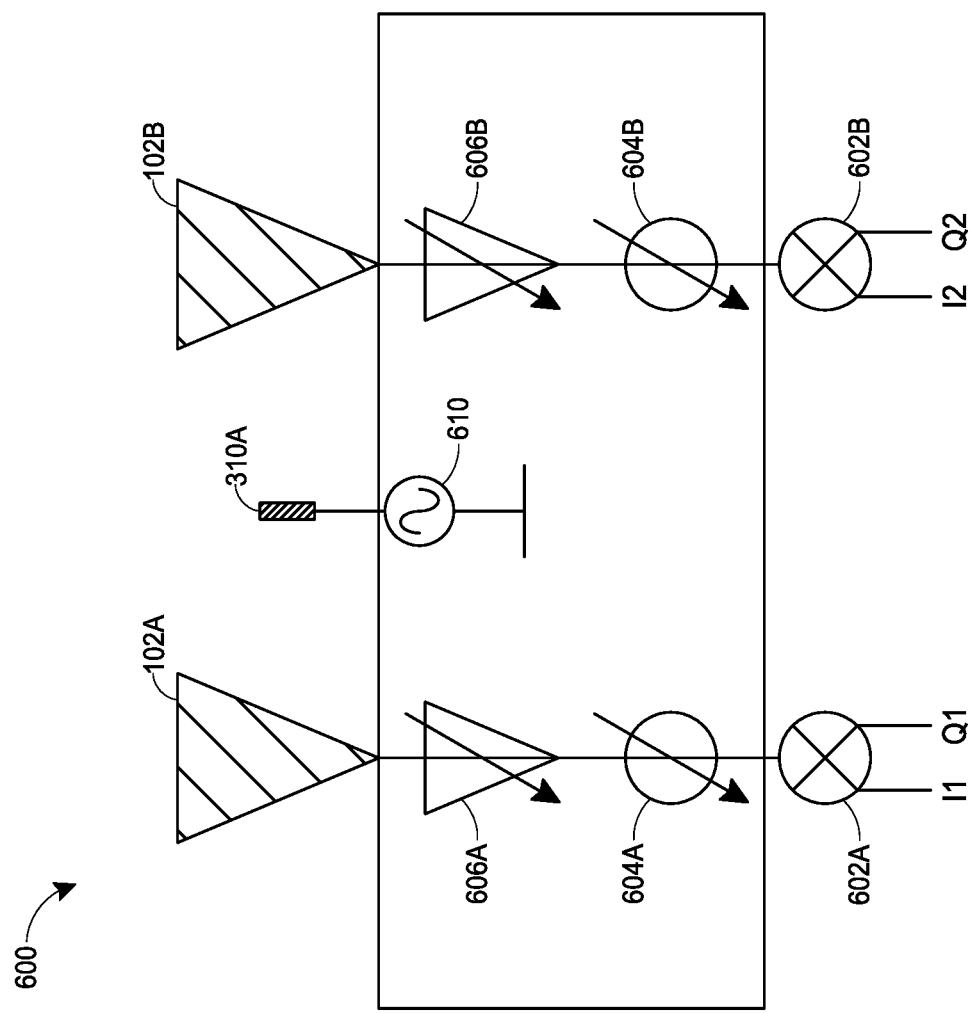
FIG. 6A is a schematic block diagram of a probe with an RF power source disposed between two antenna elements according to an embodiment.

FIG. 6A is a schematic block diagram of a probe 310A with an RF power source 610 disposed between two antenna elements 102A, 102B according to an embodiment. In this block diagram 600, the probe 310A is disposed equidistant between the two antenna elements 102A, 102B. The probe 310A may transmit a signal for the antenna elements 102A and 102B to receive.

Figure 6B:
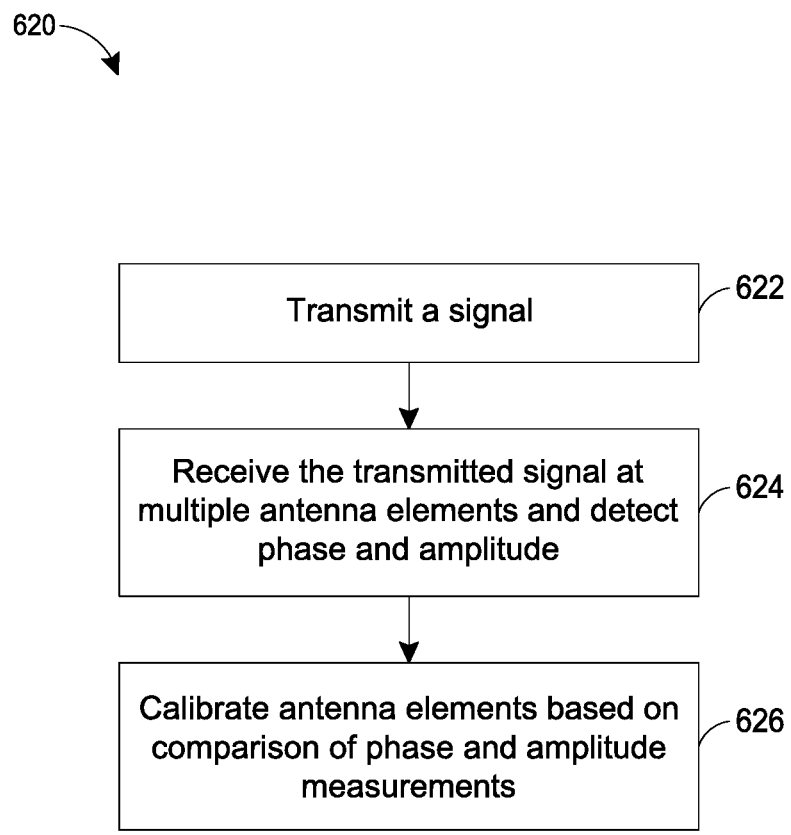
FIG. 6B is a flow diagram for calibration using a probe with an RF power source disposed between two antenna elements according to an embodiment.

FIG. 6B is a flow diagram for calibration using a probe with an RF power source disposed between two antenna elements according to an embodiment. At block 622, the probe 310A is a radiating element that transmits a signal. The probe 310A can be connected to an RF power source 610. At block 624, the antenna elements 102A, 102B receives the signal transmitted from the probe 310A. The antenna elements 102A, 102B can be connected to a phase adjuster 604A and 604B, the variable gain amplifier 606A, 606B, and an I/Q mixer 602A, 602B. The antenna elements 102A, 102B receives the signal and detects the phase and amplitude using the I/Q mixer 602A, 602B. At block 626, the antenna elements are calibrated based on a comparison of the detected phase and amplitude measurements.

Antenna Element Relative Calibration

This disclosure provides systems and methods for calibration of antenna arrays, such as fifth generation cellular technology (5G) phased antenna arrays. In some embodiments, systems and methods of the present disclosure include relative calibration between probes and antenna elements (e.g., patches), between a plurality of antenna elements of an antenna array, and/or between antenna elements of different arrays. With such calibration, the number of probes for performing relative calibration can be reduced relative to other methods of antenna array calibration and/or the number of probe inputs/outputs ports can be reduced for the active antenna array chip comprising the antenna array and the probe relative to other methods of active antenna array calibration. Antenna element calibration discussed herein can involve calibrating a transmit path associated with an antenna element and/or calibrating a receive path associated with the antenna element. The transmit path can include an upconverter and a transmit beamformer. The receive path can include a downconverter and a receive beamformer.

The calibration discussed with reference to FIGS. 7 to 17 can provide a number of advantages relative to other technology. For example, calibration discussed herein can be performed with real data from intermediate frequency and/or baseband ports for accurate calibration over frequency. Upconverter and/or downconverter circuitry can be used for calibration such that a dedicated observation path for calibration can be omitted. A local oscillator signal is not directly coupled to a probe in embodiments discussed herein. This can mitigate local oscillator leakage risk. A dynamic range specification for an analog-to-digital converter for calibration can be reduced in certain embodiments.

Calibration can be implemented with a relatively small amount of dedicated calibration hardware. For example, a loop back input can be provided to a downconverter before a downconverting mixer, a coupler output to the upconverter can be included after an upconverting mixer, and switch(es) to the probe(s) can be included in an active antenna system for calibration.

Embodiments discussed herein use an upconverter and/or a downconverter with an additional output port and/or input port to calibrate a phase antenna array at the system level. Such a system can include upconverter/downconverter circuitry, beamformer circuitry, and an antenna array that includes antenna elements and probe(s). Calibration described herein can be performed using embedded probe(s) in an antenna array. The probe(s) can be excited by ports from upconverter/downconverter circuitry though a beamformer.

Figure 7:
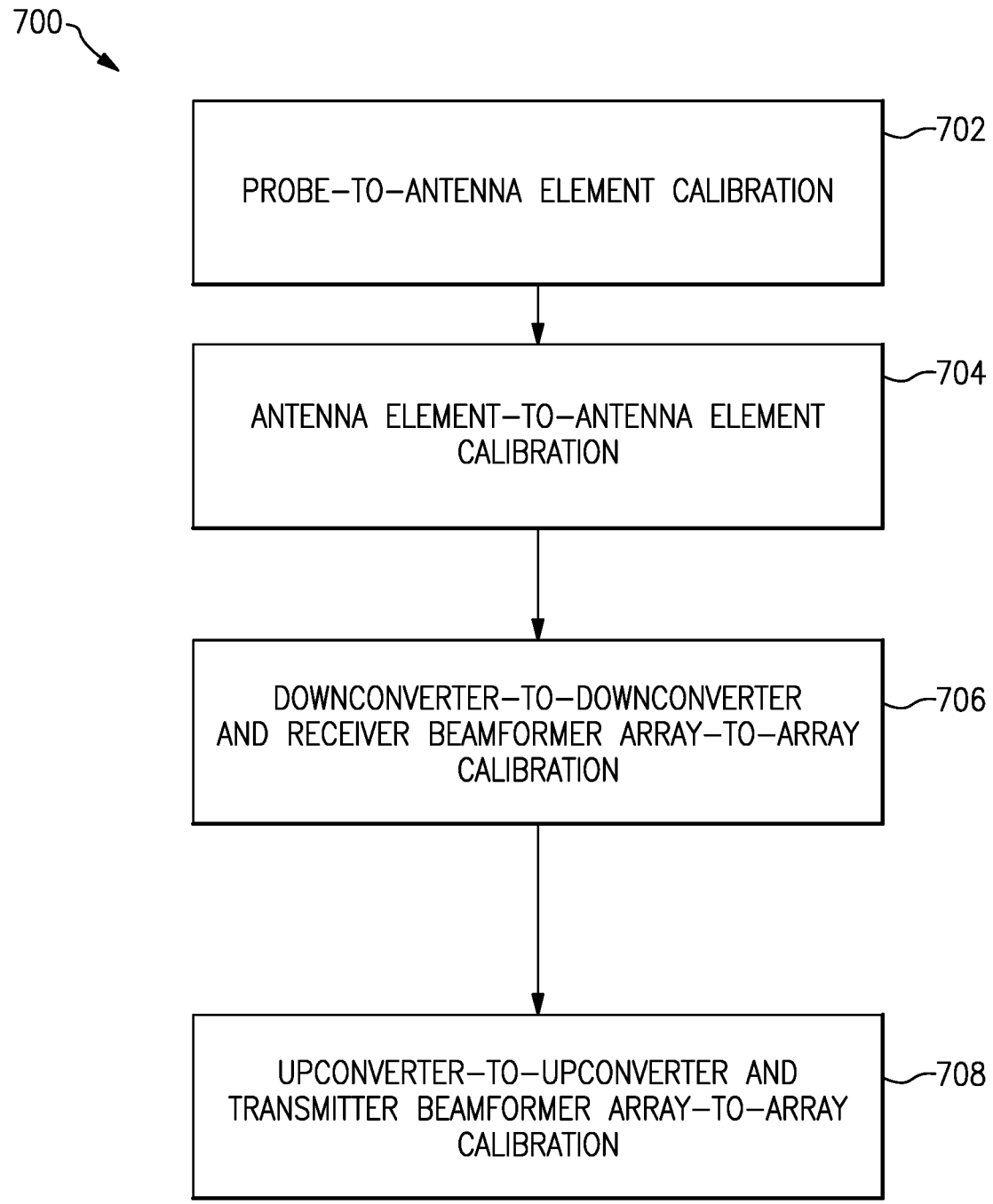
FIG. 7 is a flow diagram for a process of calibration between a probe and antenna elements, between antenna elements, and between antenna arrays according to an embodiment.

FIG. 7 is a flow diagram for a process 700 of calibration between a probe and antenna elements, between antenna elements, and between antenna arrays according to an embodiment. At block 702, one or more probes disposed substantially equidistant to two antenna elements of an array of antenna elements can be used to calibrate the two antenna elements relative to each other. For example, a probe can transmit one or more signals that can be received by two antenna elements. Based on observations of the received signals (e.g., the power and/or phase measurements of the one or more signals received at the antenna elements), a programmable amplifier and/or phase shifters corresponding to one or more of the two antenna elements can be adjusted to calibrate the receive path for the two antenna elements relative to each other due to the shared transmit path to the probe. The two antenna elements can each transmit a signal received by a probe. Based on observations of the received signals (e.g. the power and/or phase measurements of the one or more signals received at the probe), the programmable amplifier and/or phase shifter corresponding to one or more of the two or more antenna elements can be adjusted to calibrate the transmit path for the two antenna elements relative to each other due to the shared receive path of the probe. Accordingly, both the transmit and receive paths for the two antenna elements can be calibrated relative to each other. In some embodiments, the probe signal can be received by more than two antenna elements and/or signals transmitted by more than two antenna elements can be received by the probe for relative calibration.

Probe to antenna element calibration can be implemented in accordance with any suitable principles and advantages discussed herein, such as any suitable principles and advantages discussed with reference to one or more of FIGS. 1A to 6B.

At block 704, where the antenna elements are substantially equidistant (e.g., equidistant or approximately equidistant) from each other, other antenna elements can be calibrated based on the two antenna elements calibrated relative to each other. For example, a first antenna element of the two antenna elements can transmit a signal. The transmitted signal can be received by a second antenna element of the two antenna elements and also received by a third antenna element. The received signal can be used to calibrate the receive path of the second and third antenna elements relative to each other. In some embodiments, the first and third antenna elements can each transmit a signal to the second antenna element. Based on observations of the received signals (e.g., measurements of phase and/or amplitude of the received signals at the second antenna element from the first and third antenna elements), the transmit path for the first and third antenna elements can be calibrated relative to each other. Advantageously, the number of probes can be reduced with the operations at blocks 702 and 704 relative to other calibration methods.

At block 706, array to array relative calibration can be performed for downconverters and/or receive beamformers in receive paths. For example, a first antenna element of the first array can be substantially equidistant to a second antenna element of the first array and a third antenna element of the second array. The first antenna element and the second antenna element of the first array can be calibrated relative to each other. The first antenna element of the first array can transmit a signal, the signal received by the second antenna element of the first array and the third antenna element of the second array. Based on observations of the received signals, receive paths for the second antenna element of the first array and the third antenna element of the second array can be calibrated relative to each other. In some embodiments, an array can include one or more subarrays.

At block 708, array to array relative calibration can be performed for upconverters and/or transmit beamformers in transmit paths. For example, a first antenna element of the first array can be at substantially equidistant to a second antenna element of the first array and a third antenna element of the second array. The first antenna element and the second antenna element of the first array can be calibrated relative to each other. The second antenna element of the first array and the third antenna element of the second array can each transmit a signal, the signal received by the first antenna element of the first array. Based on observations of the received signals, the transmit paths for the second antenna element of the first array and the third antenna element of the second array can be calibrated relative to each other. The operations 706 and 708 can be performed in any order as suitable.

Advantageously, relative calibration can be performed for antenna elements of the same array and/or antenna elements across different antenna arrays. In some embodiments, the relative calibration can be performed with a relatively small amount of dedicated calibration hardware. For example, a coupler and a switch can be used for transmitting and/or receiving the signals to the probes. Advantageously, the relative calibration disclosed herein can reduce the analog-to-digital converter dynamic range requirement for calibration. In some embodiments, the local oscillator (LO) signal is not directly coupled to the probes for calibration, mitigating LO leakage. Furthermore in some embodiments, the up and down converter circuitry may be unmodified for the relative calibration.

Any antenna element discussed herein can be implemented by any suitable antenna element for performing signal transmission and/or reception. In some embodiments, an antenna element can include a patch, a radiator of the antenna array, an antenna, a dipole, and/or the like. For example, an antenna array can include 8×8 radiators, whereby each radiator is relatively calibrated to at least one other radiator using the process 700 described above. A probe can include any suitable element for performing signal transmission and/or reception, such as a patch, a radiator, an antenna, a dipole, and/or the like. The probe can be connected to the upconverter and/or downconverter without an intervening beamformer. The probe can be suitable for calibration applications. The probe may not be suitable for typical transmission and reception with the entire antenna array.

Antenna Element Relative Calibration for Antenna Array Using Two Probes

Figure 8A:
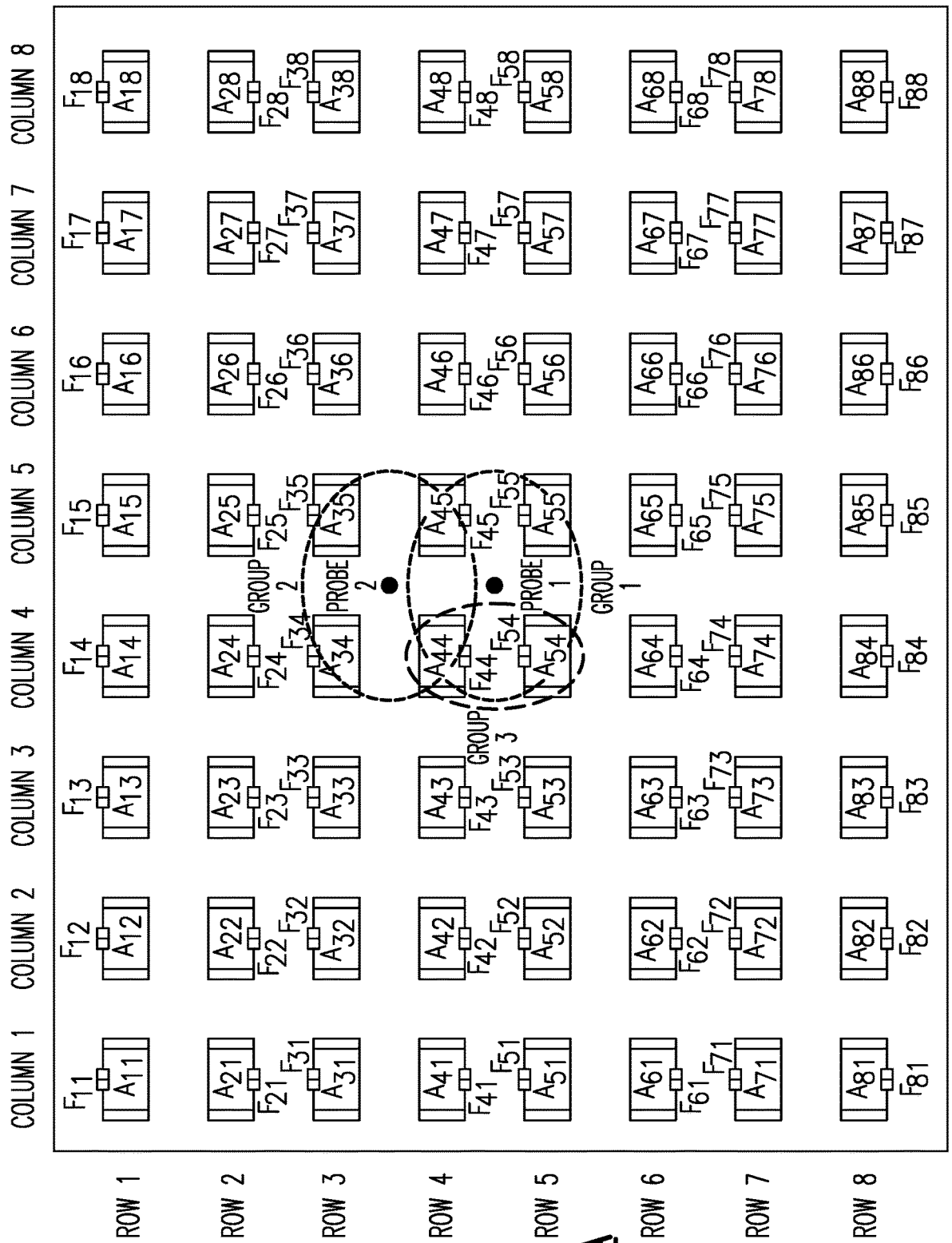
FIG. 8A illustrates an 8×8 antenna array with two probes for calibration according to an embodiment.
Figure 8B:
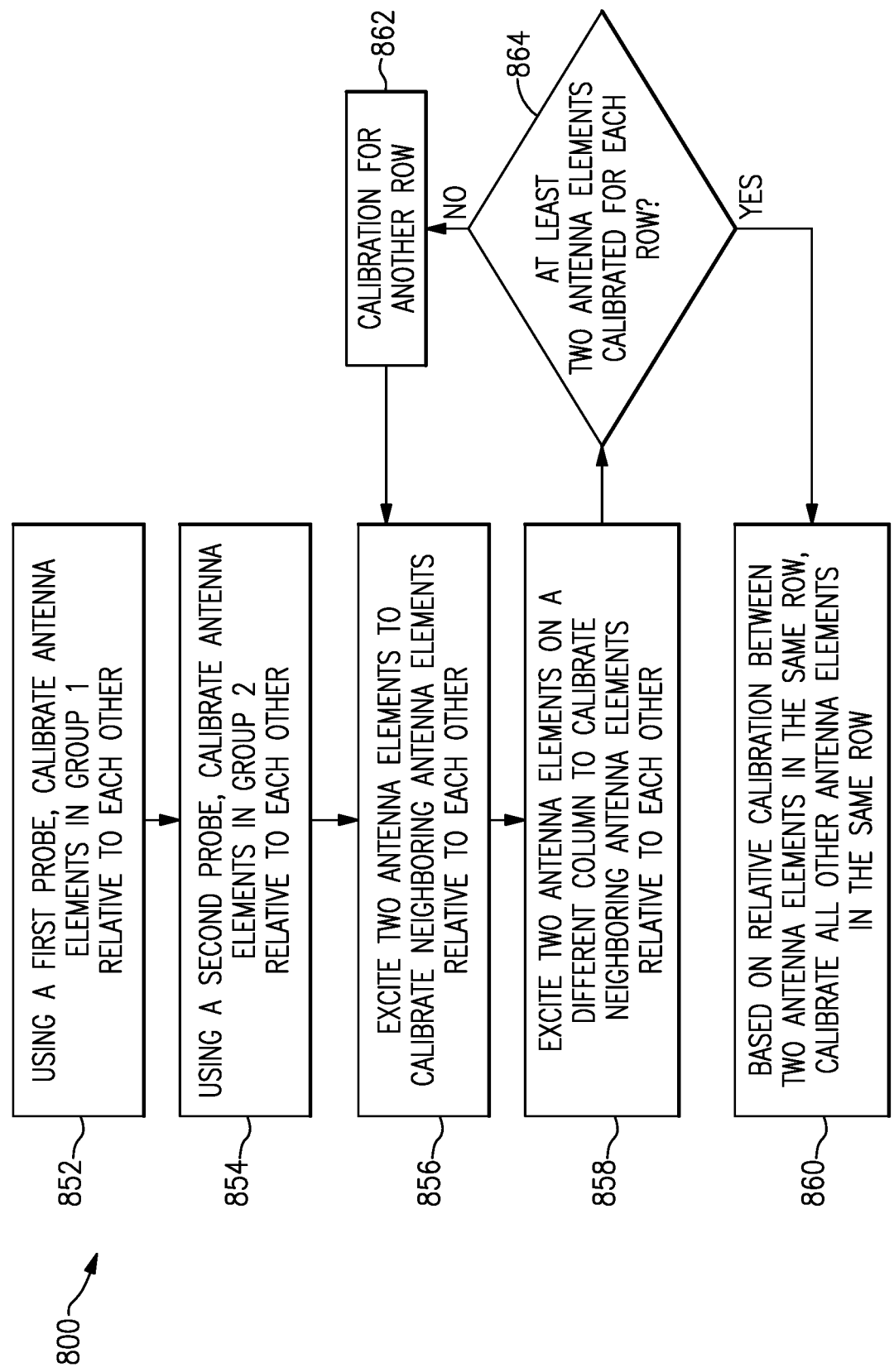
FIG. 8B illustrates a flow diagram for a process of calibration that can be applied to an 8×8 antenna array according to an embodiment.

FIG. 8A illustrates an 8×8 antenna array with two probes according to an embodiment. FIG. 8B illustrates a flow diagram for a process of calibration that can be applied to an 8×8 antenna array according to an embodiment.

In the example of FIG. 8A, the 8×8 antenna array can include antenna elements across 8 rows and 8 columns. The illustrated antenna array includes antenna elements $A_{11}$ to $A_{88}$ and two probes. Accordingly, a chip that includes the array can have two probe input/outputs, one for each probe. Each of the antenna elements $A_{11}$ to $A_{88}$ includes a respective feeding point $F_{11}$ to $F_{88}$. The Feeding points $F_{11}$ to $F_{88}$ can be disposed in different locations for certain antenna elements. For example, the feeding point $F_{33}$ is located at a different point of antenna element $A_{33}$ than where the feeding point $F_{43}$ is located on antenna element $A_{43}$. The antenna elements can be disposed substantially equidistant from neighboring antenna elements. For example, the antenna element $A_{11}$ is equidistant to antenna elements $A_{12}$ and $A_{21}$.

The antenna array of FIG. 8A includes two probes. The probes can be substantially equidistant from antenna elements. For example, probe 1 can be equidistant from antenna elements $A_{44}$, $A_{45}$, $A_{54}$, and $A_{55}$. Probe 2 can be equidistant from antenna elements $A_{44}$, $A_{34}$, $A_{45}$, and $A_{35}$. In the antenna array of FIG. 8A, probe 1 is located a first distance from feeding points of the nearest antenna elements and probe 2 is located a second distance from feedback points of the nearest antenna elements, in which the first distance is not equal to the second distance.

The process of FIG. 8B can calibrate transmit and/or receive paths of antenna elements of an antenna element array relative to each other using two probes. The process is an example method of implementing blocks 702 and 704 of the process of FIG. 7. The process of FIG. 8B can be applied to the 8×8 antenna array of FIG. 8A. At block 852, using a first probe, the antenna elements of group 1 can be calibrated relative to each other. For example, Group 1 can include antenna elements $A_{44}$, $A_{45}$, $A_{54}$, and $A_{55}$ of FIG. 8A. One or more signals can be transmitted from probe 1 and received by antenna elements $A_{44}$, $A_{45}$, $A_{54}$, and $A_{55}$. Based on the received signals at antenna elements $A_{44}$, $A_{45}$, $A_{54}$, and $A_{55}$, the receive paths for the antenna elements $A_{44}$, $A_{45}$, $A_{54}$, and $A_{55}$ can be calibrated relative to each other. In some embodiments, one or more signals can be transmitted from the antenna elements $A_{44}$, $A_{45}$, $A_{54}$, and $A_{55}$ and received by probe 1. Based on the received signals at probe 1, the transmit paths for the antenna elements $A_{44}$, $A_{45}$, $A_{54}$, and $A_{55}$ can be calibrated relative to each other.

At block 854, using a second probe, the antenna elements of group 2 can be calibrated relative to each other. For example, Group 2 can include antenna elements $A_{44}$, $A_{45}$, $A_{34}$, and $A_{35}$. One or more signals can be transmitted from probe 2 and received by antenna elements $A_{44}$, $A_{45}$, $A_{34}$, and $A_{35}$. Based on the received signals at antenna elements $A_{44}$, $A_{45}$, $A_{34}$, and $A_{35}$, the receive paths for the antenna elements antenna elements $A_{44}$, $A_{45}$, $A_{34}$, and $A_{35}$ can be calibrated relative to each other. In some embodiments, one or more signals can be transmitted from the antenna elements antenna elements $A_{44}$, $A_{45}$, $A_{34}$, and $A_{35}$ and received by probe 2. Based on the received signals at probe 2, the transmit paths for the antenna elements antenna elements $A_{44}$, $A_{45}$, $A_{34}$, and $A_{35}$ can be calibrated relative to each other. Accordingly, antenna elements are calibrated relative to each other in rows 3, 4, and 5 of the antenna array.

At block 856, two antenna elements can be excited simultaneously to calibrate neighboring antenna elements relative to each other. For example, antenna elements $A_{44}$ and $A_{54}$ can be excited simultaneously to provide signals to be received at antenna elements $A_{34}$ and $A_{64}$. Based on the received signals at antenna elements $A_{34}$ and $A_{64}$, the receive paths for the antenna elements antenna elements $A_{34}$ and $A_{64}$ can be calibrated relative to each other. In some embodiments, one or more signals can be transmitted from the antenna elements antenna elements $A_{34}$ and $A_{64}$ and received by antenna elements $A_{44}$ and $A_{54}$. Based on the received signals at $A_{44}$ and $A_{54}$, the transmit paths for the antenna elements antenna elements $A_{34}$ and $A_{64}$ can be calibrated relative to each other.

If a feeding point to the antenna elements of an array are not at the same position for antenna elements in each of the rows, then the simultaneous excitation can be helpful. For example, the feeding points (e.g. $F_{11}$, $F_{12}$, . . . , $F_{18}$) for the antenna elements of row 1 (e.g. All, $A_{12}$, . . . , $A_{18}$) are at the top of the antenna elements in the illustrated orientation. However, the feeding points (e.g. $F_{21}$, $F_{22}$, . . . , $F_{28}$) for the antenna elements of row 2 (e.g. $A_{21}$, $A_{22}$, . . . , $A_{18}$) are at the bottom in the illustrated orientation. Thus, the feeding points are not at the same positions for each row. However, if the antenna elements for $A_{21}$ and $A_{31}$ are excited simultaneously, the antenna elements $A_{11}$ and $A_{41}$ can receive a substantially similar signal. This is because antenna elements $A_{11}$ and $A_{21}$ are symmetrically disposed relative to $A_{31}$ and $A_{41}$. Thus, antenna elements $A_{11}$ and $A_{41}$ can be calibrated relative to each other.

At block 858, two antenna elements of a column can be excited simultaneously to calibrate neighboring antenna elements relative to each other. For example, antenna elements $A_{45}$ and $A_{55}$ can be excited simultaneously to be received at antenna elements $A_{35}$ and $A_{65}$. Based on the received signals at antenna elements $A_{35}$ and $A_{65}$, the receive paths for the antenna elements antenna elements $A_{35}$ and $A_{65}$ can be calibrated relative to each other. In some embodiments, one or more signals can be transmitted from the antenna elements antenna elements $A_{35}$ and $A_{65}$ and received by antenna elements $A_{45}$ and $A_{55}$. Based on the received signals at $A_{45}$ and $A_{55}$, the transmit paths for the antenna elements antenna elements $A_{35}$ and $A_{65}$ can be calibrated relative to each other.

At block 864, if there are at least two antenna elements calibrated for each row, then the flow diagram proceeds to block 860. Otherwise, calibration is performed for another row at block 862. For example, blocks 856 and 858 can be repeated to calibrate antenna elements $A_{[row\ number]4}$ and $A_{[row\ number]5}$ in rows 2 and 5 relative to each other, antenna elements in rows 1 and 4 relative to each other, antenna elements in rows 7 and 4 relative to each other, and antenna elements in rows 8 and 5 relative to each other. Accordingly, antenna elements are calibrated relative to each other for each of the rows.

At block 860, based on relative calibration between two antenna elements in the same row, antenna elements in the same row are calibrated relative to each other. For example, for row 5, antenna elements $A_{54}$ and $A_{55}$ are calibrated relative to each other. Antenna element $A_{54}$ can transmit one or more signals to be received by antenna elements $A_{55}$ and $A_{53}$. Based on the received signals, the receive paths for antenna elements $A_{55}$ and $A_{53}$ can be calibrated relative to each other. In some embodiments, the antenna elements $A_{55}$ and $A_{53}$ transmit one or more signals to be received by antenna element $A_{54}$. Based on the received signal, the transmit paths of the antenna elements $A_{55}$ and $A_{53}$ can be calibrated relative to each other.

This process can be repeated for the other antenna elements in the row. For example, pairs of antenna elements (e.g. $A_{52}$ and $A_{54}$, $A_{53}$ and $A_{51}$, $A_{54}$ and $A_{56}$, $A_{55}$ and $A_{57}$, and $A_{56}$ and $A_{58}$) can be calibrated relative to each other. The relative calibration can be performed for each row. Accordingly, the antenna elements of an array (such as an 8×8 array) can be calibrated relative to each other.

Advantageously, with 2 probes, the antenna elements of the antenna array of FIG. 8A can be calibrated relative to each other. Furthermore, antenna elements can be calibrated relative to each other with 2 probes for arrays with similar feeding point and antenna element arrangements as shown in FIG. 8A regardless of the size of the array using the method described in FIG. 8B. In traditional systems, without implementing the antenna element to antenna element calibration, a probe may be disposed equidistant among antenna elements. For example, a probe may be disposed equidistant among four antenna elements (e.g. probe 1 between $A_{44}$, $A_{45}$, $A_{34}$, and $A_{35}$). Accordingly, if an antenna array includes N×M antenna elements, the system may include (N−1)*(M−1) probes. In other systems, a probe may be placed between two antenna elements (e.g. a probe between $A_{11}$ and $A_{21}$, another probe between $A_{21}$ and $A_{31}$). In this circumstance, the system may include [(N)*(M−1)]+[(N−1)*(M)] probes. Systems and methods of antenna array calibration discussed herein can reduce the amount of probes for performing relative calibration relative to previous calibration methods. Moreover, such systems and methods can also reduce the number of probe input/outputs of an antenna array chip. For instance, active antenna array chips discussed herein have fewer than $(N-1)*(M-1)$ probes and corresponding probe input/outputs. More specifically, active antenna array chips discussed with reference to FIGS. 8A to 17 include one probe with one probe input/output or two probes with two probe input/outputs.

Antenna Element Relative Calibration for Antenna Array Using One Probe

Figure 9:
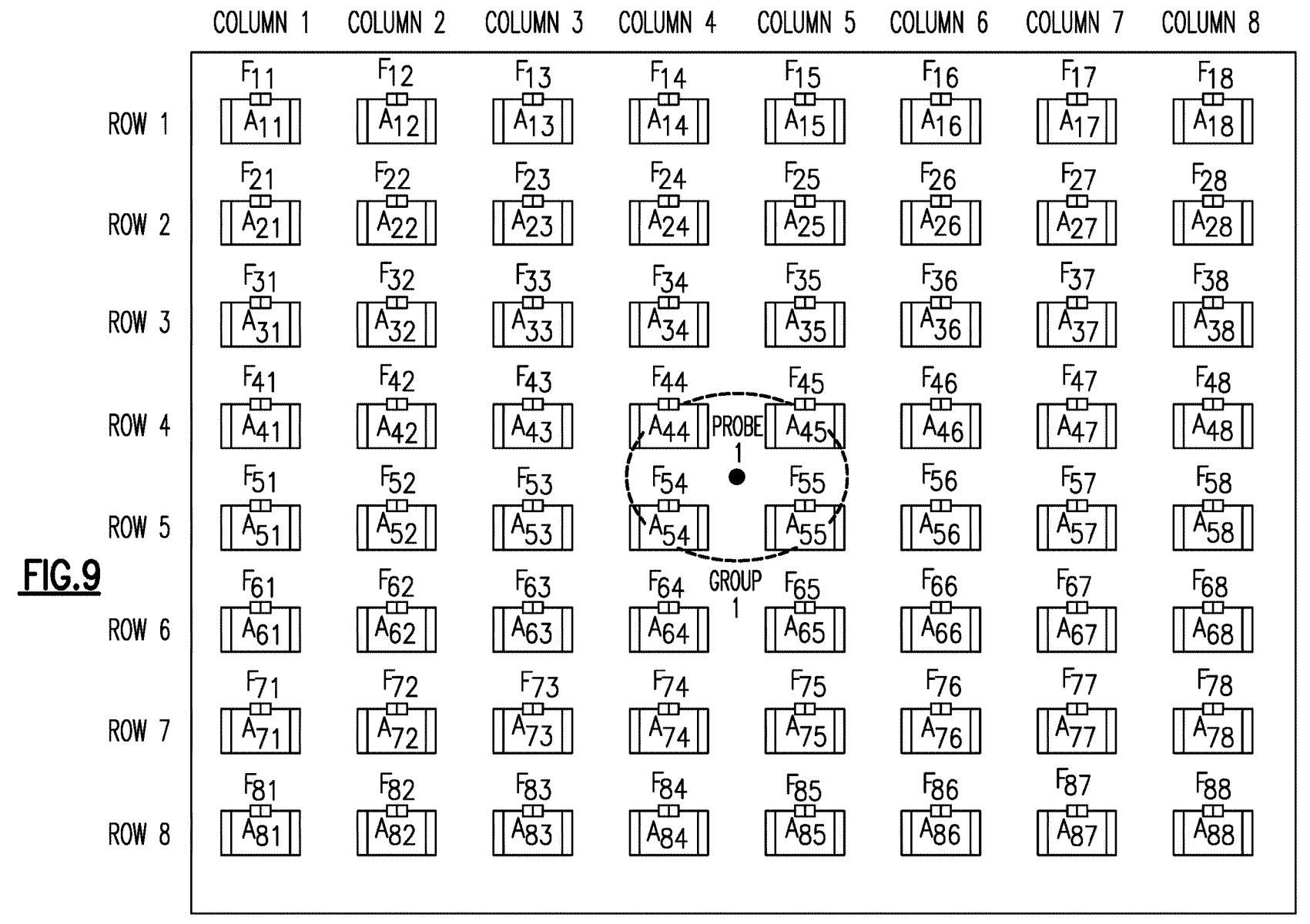

FIG. 9 illustrates an 8×8 antenna array with one probe according to an embodiment. In some embodiments, the feed point (e.g., $F_{11}$) for the antenna elements (e.g., $A_{11}$) can be placed at the same position for each antenna element of the array. For example, the feed points can all be placed at the top of the antenna elements in the orientation illustrated in FIG. 9. In this scenario, relative calibration can be performed using a single probe. Accordingly, a chip that includes the array can have one probe input/output.

For example, as described above for block 852, a first probe can be used to calibrate antenna elements in group 1. Accordingly, antenna elements for each of rows 4 and 5 can be calibrated relative to each other. Furthermore, antenna elements for each of columns 4 and 5 can be calibrated relative to each other.

For example, as described above for block 860, two antenna elements in a single row that are calibrated relative to each other can be used to calibrate all antenna elements in that same row. Similar to the concepts described for block 860, two antenna elements in a single column that are calibrated relative to each other can be used to calibrate all antenna elements in that same column. Advantageously, the 8×8 antenna elements shown in FIG. 9 can be calibrated relative to each other using a single probe because the feed points for the antenna elements are symmetrical across rows and columns.

Probe to Antenna Element Relative Calibration

Figure 10:
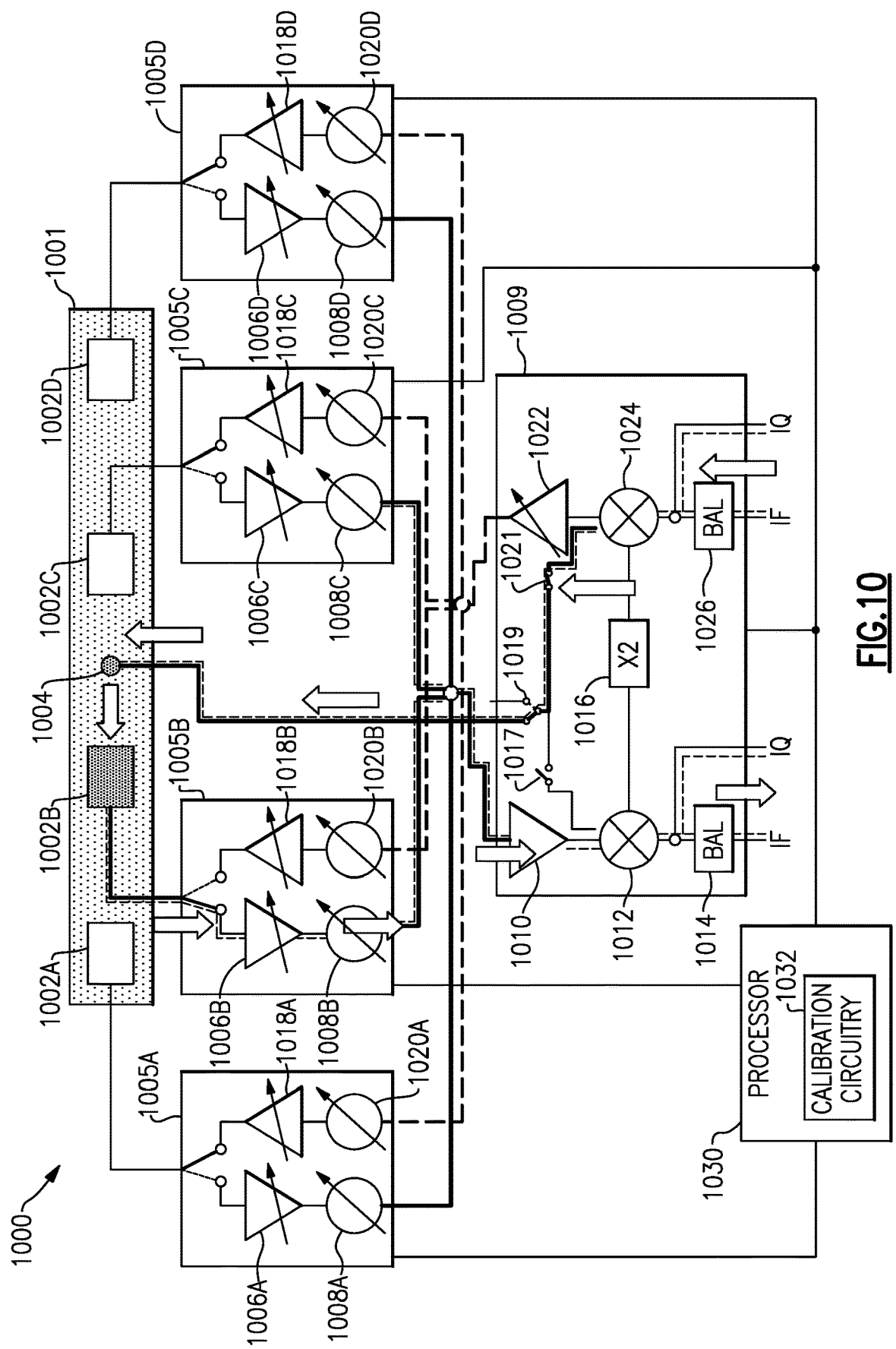
FIG. 10 illustrates signal flow for probe to antenna element calibration for a receive path in an active antenna system according to an embodiment.
Figure 11:
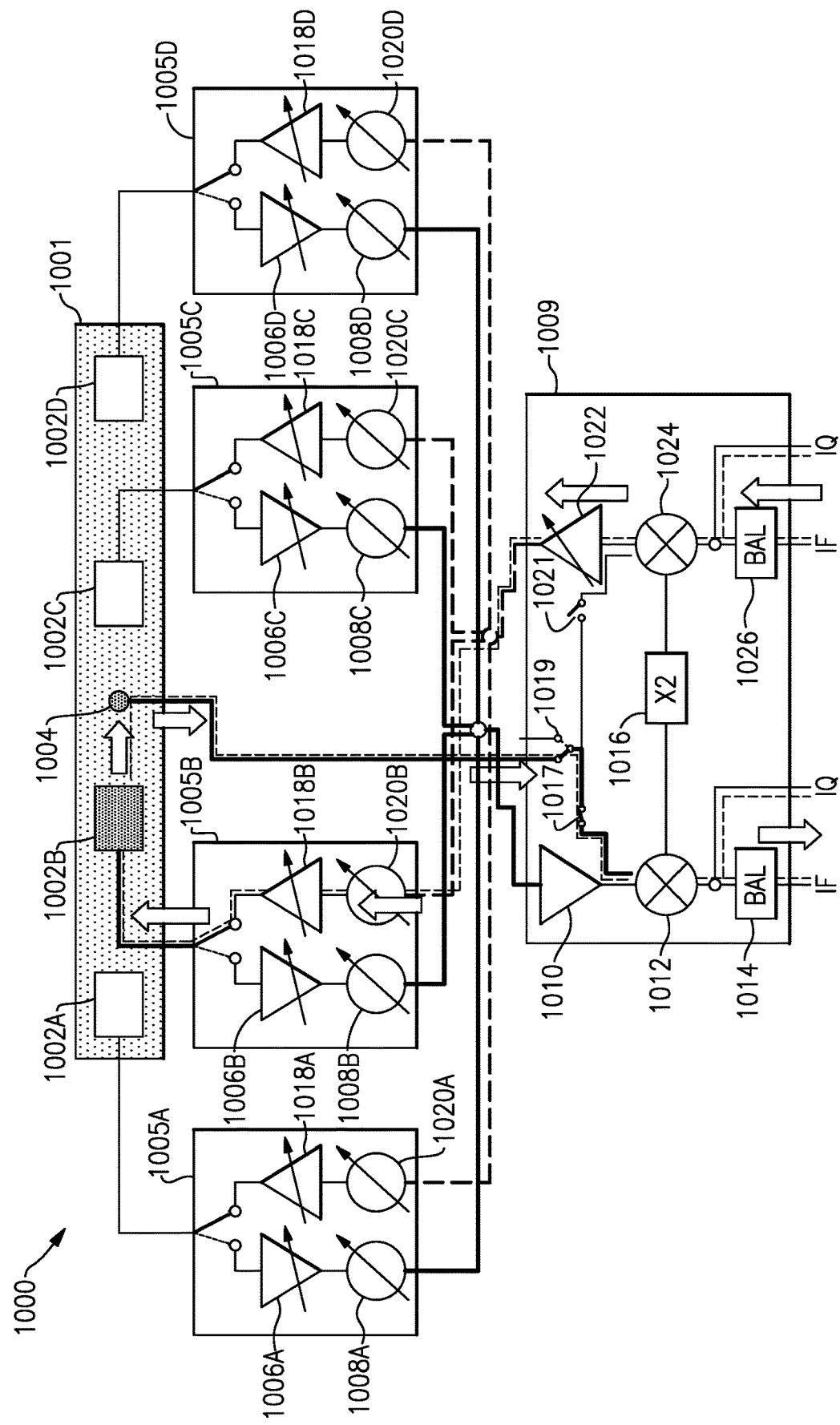
FIG. 11 illustrates signal flow an antenna element to antenna element calibration for a transmit path in an active antenna system according to an embodiment.

FIG. 10 illustrates signal flow for probe to antenna element calibration for a receive path in an active antenna system 1000 according to an embodiment. FIG. 11 illustrates signal flow for probe to antenna element calibration for the transmit path in an active antenna system 1000 according to an embodiment. These figures can illustrate the same active antenna system 1000 in different states for calibrating different paths. FIGS. 10 and 11 illustrate example systems and signal flows that can correspond to operation 702 of the process 700, operation 852 of the process 800, or operation 854 of the process 800. The illustrated active antenna system 1000 includes an active antenna array chip 1001, beamformers 1005A to 1005D, upconverter and downconverter circuitry 1009, and a processor 1030. The processor 1030 the calibration circuitry 1032 can be included in any other active antenna systems discussed herein, such as the active antenna systems shown in FIGS. 11, 12, 13, 16, and 17.

In FIG. 10, the active antenna array chip 1001 includes four antenna elements 1002A, 1002B, 1002C, and 1002D (collectively referred to as antenna elements 1002). The illustrated active antenna array chip 1001 can also include a probe 1004. The probe 1004 can be disposed within the array of the antenna elements 1002. In alternative embodiments, the probe 1004 can be disposed outside of the array of the antenna elements 1002. Moreover, active antenna array chip 1001 can include two probes, for example, in accordance with the principles and advantages discussed with reference to FIGS. 8A and/or 8B.

As illustrated, the processor 1030 includes calibration circuitry 1032. The calibration circuitry 1032 can provide signals to the beamformers 1005A, 1005B, 1005C, and 1005D (collectively referred to herein as beamformers 1005) to calibrate the phase and amplitude for receive and transmit paths. The receive paths of the beamformers 1005 can include a programmable gain amplifier 1006A, 1006B, 1006C, and 1006D (collectively referred to as receive path programmable gain amplifiers 1006) and/or a phase shifters 1008A, 1008B, 1008C, and 1008D (collectively referred to as receive path phase shifters 1008). The beamformers 1005 can include a programmable gain amplifier 1018A, 1018B, 1018C, and 1018D (collectively referred to as transmit path adjustable gain amplifiers 1018) and/or a phase shifters 1020A, 1020B, 1020C, and 1020D (collectively referred to as transmit path phase shifters 1020).

The downconverter circuitry can include an amplifier 1010, a mixer 1012, and/or a balancer 1014. The upconverter circuitry can include an amplifier 1022, a mixer 1024, and/or a balancer 1026. The balancer 1014 and/or the balancer 1026 can mitigate inbalances in the in-phase and quadrature (IQ) signals due to mismatching.

The probe 1004 can be connected to the upconverter circuitry and/or the downconverter circuitry. The probe 1004 can be connected to the upconverter circuitry and the downconverter circuitry using one or more switches 1017, 1019, 1021. The switch 1019 can selectively electrically connect a probe (such as the probe 1004 or a second probe of the active antenna array chip 1001) to a path to a mixer of the upconverter/downconverter circuitry 1009. A first switch 1017 and the second switch 1019 can be used to provide a signal received by the probe 1004 to the mixer 1012 of the downconverter circuitry in the state corresponding to FIG. 11. The third switch 1021 can be open to prevent the signal received by the probe 1004 from propagating to the transmit path. Advantageously, the probe 1004 can be implemented for relative calibration with reduced wiring between the probe and the upconverter/downconverter circuitry and reduced number of input and output ports.

As illustrated in FIG. 10, a signal can be upconverted by the mixer 1024. The signal can be coupled from an output of the mixer 1024, and provided to the probe 1004 via the switches 1021 and 1019, and transmitted from the probe 1004 in the state corresponding to FIG. 10. The probe 1004 can radiate the signal and the antenna element 1002B can receive the radiated signal. The signal received by the antenna element 1002B can propagate through the beamformer 1005B, such as the programmable gain amplifier 1006B and the phase shifter 1008B, and propagates through the amplifier 1010 and the mixer 1012 that downconverters the signal to the balancer 1014. The mixer 1012 can output IF and/or IQ signals.

A receiver can measure the amplitude and/or phase of the signal that propagated through this entire path (e.g. including from the mixer 1024 of the upconverter to the mixer 1012 of the downconverter).

A signal can be transmitted from the probe 1004 and received by the antenna element 1002C. The received signal can propagate through the programmable gain amplifier 1006C, the phase shifter 1008C, the amplifier 1010, the mixer 1012, and the balancer 1014. The power and/or phase can then be measured.

For example, the receiver can measure the amplitude and/or phase of the signal through this path. Based on the measured signals from the two paths, the one or more of the beamformers 1005 can be adjusted such that the receive paths for the two antenna elements 1002B and 1002C are calibrated relative to each other.

As illustrated in FIG. 11, a signal can be transmitted and upconverted by the mixer 1024. The signal can be phase shifted by the phase shifter 1020B, amplified by the programmable gain amplifier 1018B, and radiated from the antenna element 1002B. The probe 1004 can receive the signal. The switches 1019 and 1021 can enable the signal received by the probe 1004 to propagate to the receiver via the coupler. The switch 1017 can be open to prevent the signal from propagating to the transmit path. The receiver can measure the amplitude and/or phase of the signal that propagated through this entire path.

Another signal can be transmitted from the antenna element 1002C and received by the probe 1004. The receiver can measure the amplitude and/or phase of the signal through this path. Based on the measured signals from the two paths, one or more of the beamformers 1005 can be adjusted such that the transmit path for the two antenna elements 1002B and 1002C are calibrated relative to each other.

In some embodiments, one or more components of FIG. 10 can be included in a base station and/or a mobile device. In some embodiments, the calibration components can be integrated into the circuitry of the antenna array and/or the chip of the upconverter/downconverter.

Antenna Element to Antenna Element Relative Calibration

Figure 12:
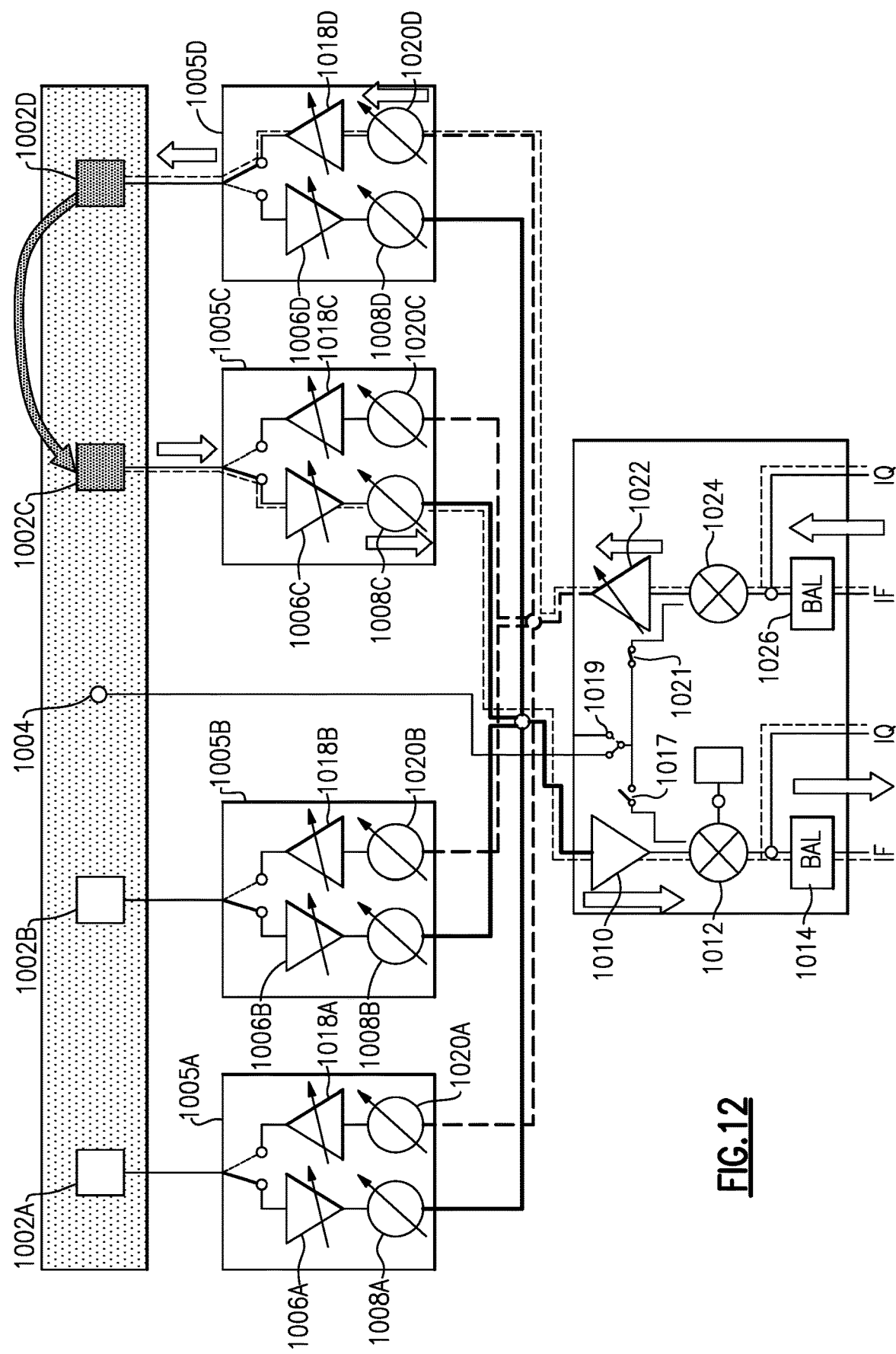
FIG. 12 illustrates signal flow for an antenna element to antenna element calibration for a transmit path in an active antenna system according to an embodiment.
Figure 13:
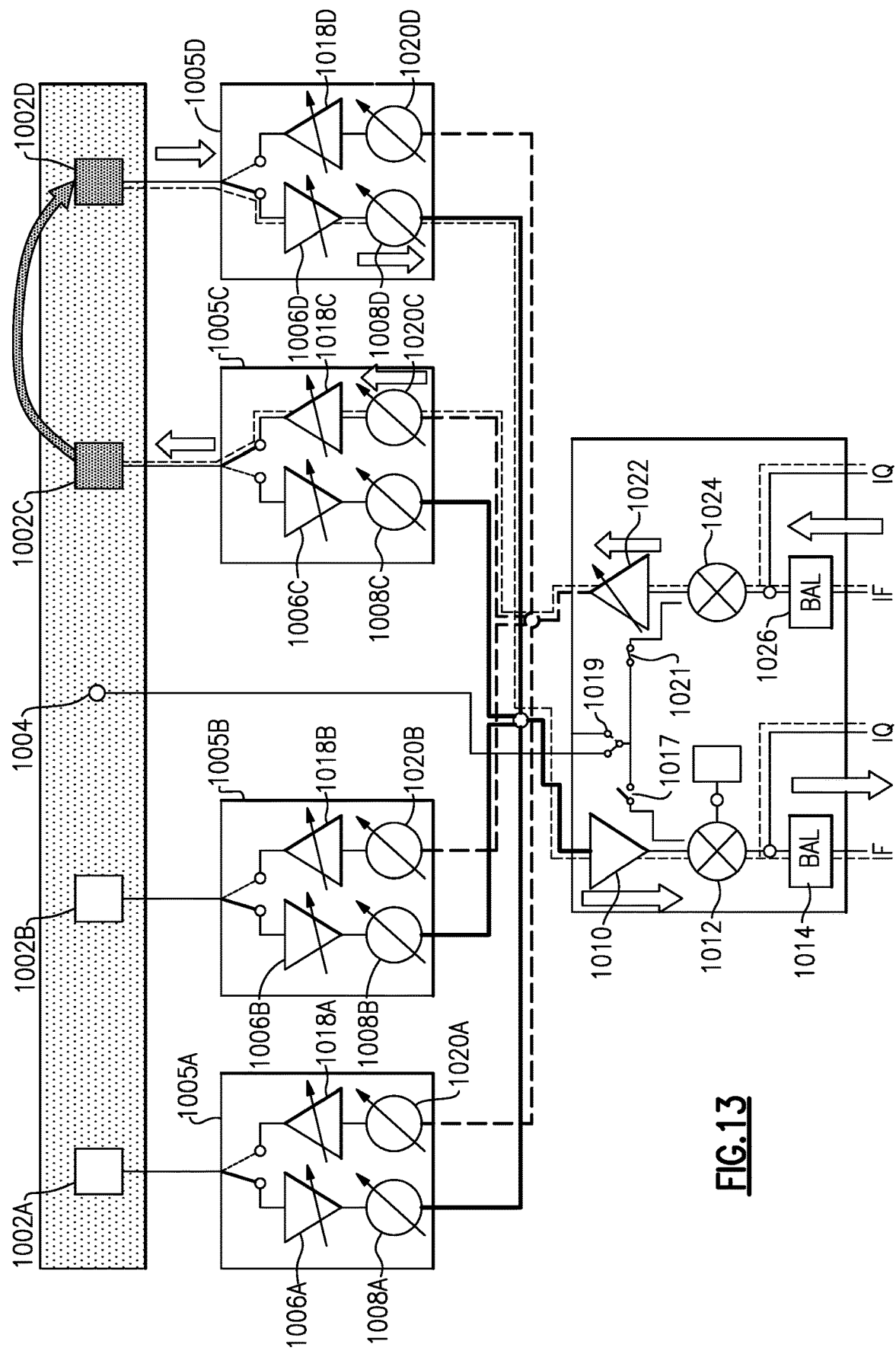
FIG. 13 illustrates signal flow for an antenna element to antenna element calibration for a receive path in an active antenna system according to an embodiment.

In some embodiments, two antenna elements that are calibrated relative to one another can be used to calibrate another antenna element. FIG. 12 illustrates signal flow for an antenna element to antenna element calibration for the transmit path in an active antenna system 1000 according to an embodiment. FIG. 13 illustrates signal flow for an antenna element to antenna element calibration for the receive path in an active antenna system 1000 according to an embodiment. These figures illustrate the same active antenna system 1000 in different states for calibrating different paths. FIGS. 12 and 13 illustrate example systems and signal flows that can correspond to operation 704 of the process 700 and/or operations 856, 858, and 860 of the process 800.

In some embodiments, antenna elements can be disposed substantially equidistant to each other. In FIG. 12, a signal can be transmitted from antenna element 1002D and received by antenna element 1002C. A signal can be transmitted from antenna element 1002B and received by antenna element 1002C. Based on the signal received at the antenna element 1002C from the antenna elements 1002B and 1002D, the receive paths for the antenna elements 1002B and 1002D can be calibrated relative to each other.

In FIG. 13, a signal can be transmitted from antenna element 1002C and received by antenna element 1002D. A signal can be transmitted from antenna element 1002C and received by antenna element 1002D. Based on the signal received at the antenna elements 1002B and 1002D from the antenna element 1002C, the transmit paths for the antenna elements 1002B and 1002D can be calibrated relative to each other.

Figure 14:
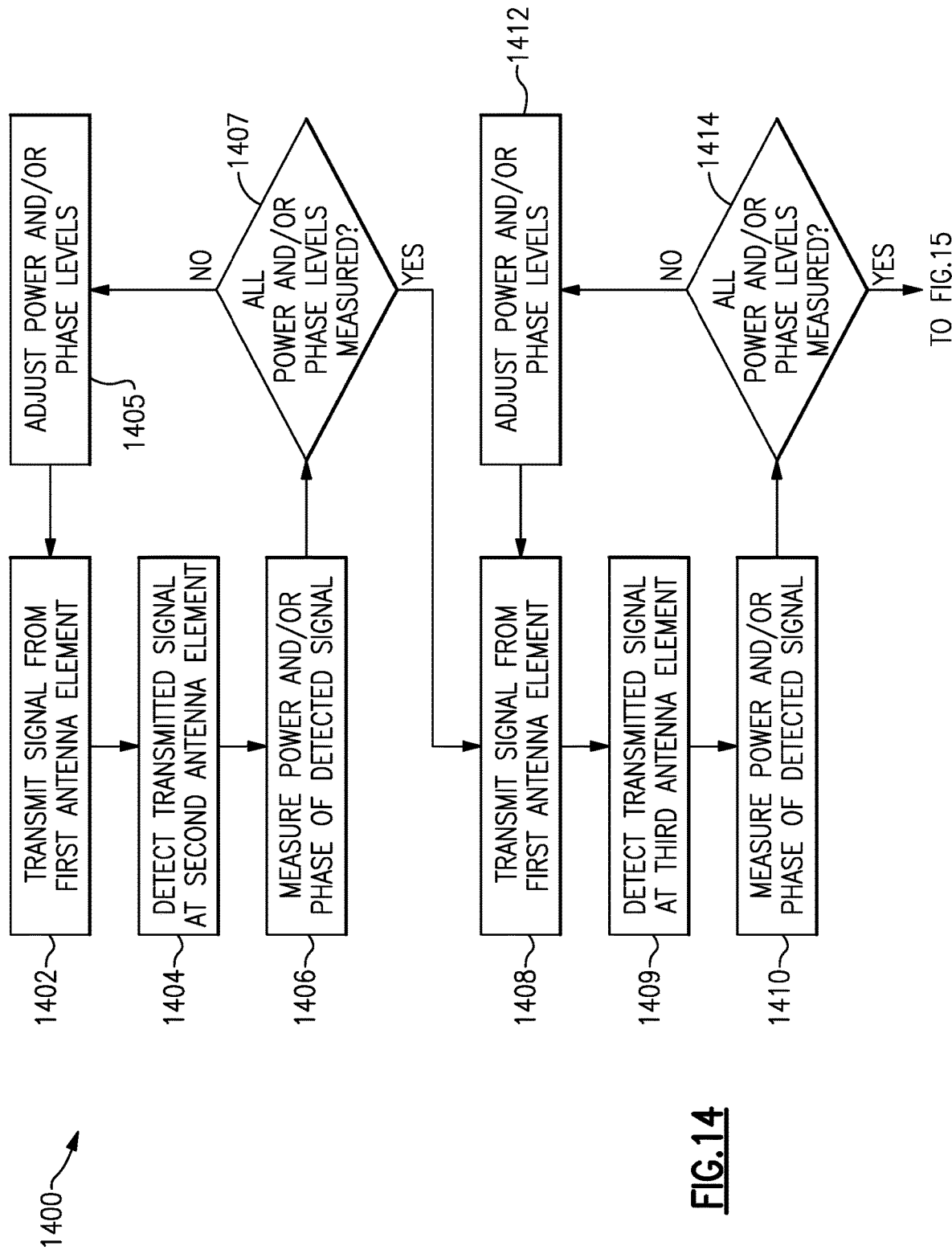
FIG. 14 illustrates a flow diagram for a process of an antenna element to antenna element calibration for the receive path according to an embodiment.

FIG. 14 illustrates a flow diagram for a process 1400 of an antenna element to antenna element calibration for the receive path according to an embodiment. The process 1400 can correspond to the operation 704 in the process 700. At block 1402 of FIG. 14, a signal can be transmitted from a first antenna element and at block 1404 the signal can be received at a second antenna element. At block 1406, the received signal can measure the power and/or phase of the detected signal. At block 1407, if all power and/or phase levels are measured, the process 1400 can proceed to block 1408. Otherwise, the phase and/or power levels can be adjusted at block 1404. At block 1408, a signal can be transmitted from a first antenna element and at block 1405 a transmitted signal can be detected at a third antenna element. At block 1414, if all power and/or phase levels are measured, the process 1400 can proceed to block 1408. Otherwise, the phase and/or power levels can be adjusted at block 1412. In some embodiments, transmitting a signal from the first antenna element at block 1402 and/or 1408 can include exciting two antenna elements (e.g., the first antenna element and a fourth antenna element) to calibrate neighboring antenna elements (e.g., the second antenna element and the third antenna element) relative to each other, such as the operation 856 described in process 800.

Figure 15:
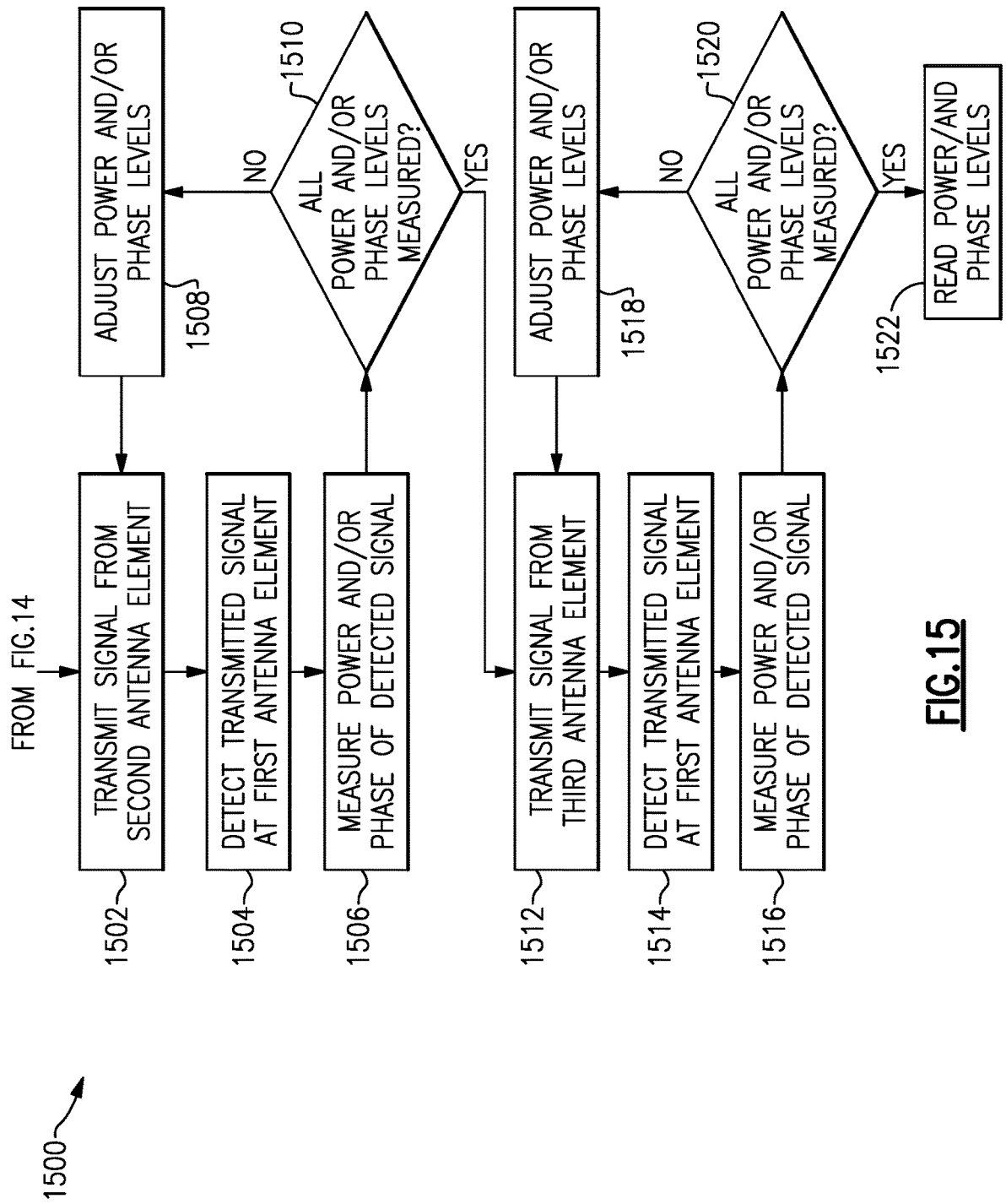
FIG. 15 illustrates a flow diagram for a process of an antenna element to antenna element calibration for the transmit path according to an embodiment.

FIG. 15 illustrates a flow diagram for a process 1500 of an antenna element to antenna element calibration for the transmit path according to an embodiment. The process 1500 can correspond to the operation 704 in the process 700. In FIG. 15, at block 1502, a signal can be transmitted from a second antenna element and at block 1504 received by a first antenna element. At block 1506, the receiver can measure the power and/or phase of the detected signal. If all power and/or phase levels are measured at block 1506, the flow diagram can proceed to block 1512. Otherwise, the beamformer components can be adjusted at block 1508.

At block 1512, a signal can be transmitted from a third antenna element and at block 1514 a first antenna element can receive the transmitted signal. At block 1516, the receiver can measure the power and/or phase of the detected signal. At block 1520, if all power and/or phase levels are measured, the flow diagram can proceed to block 1522. Otherwise, the power and/or phase levels can be adjusted at block 1518.

Antenna Array to Antenna Array Relative Calibration

In some embodiments, a first and second antenna elements on a first antenna array that are calibrated relative to one another can be used to calibrate a third antenna element on a second antenna array. In some embodiments, a first antenna element is substantially equidistant to the second and third antenna element.

Figure 16:
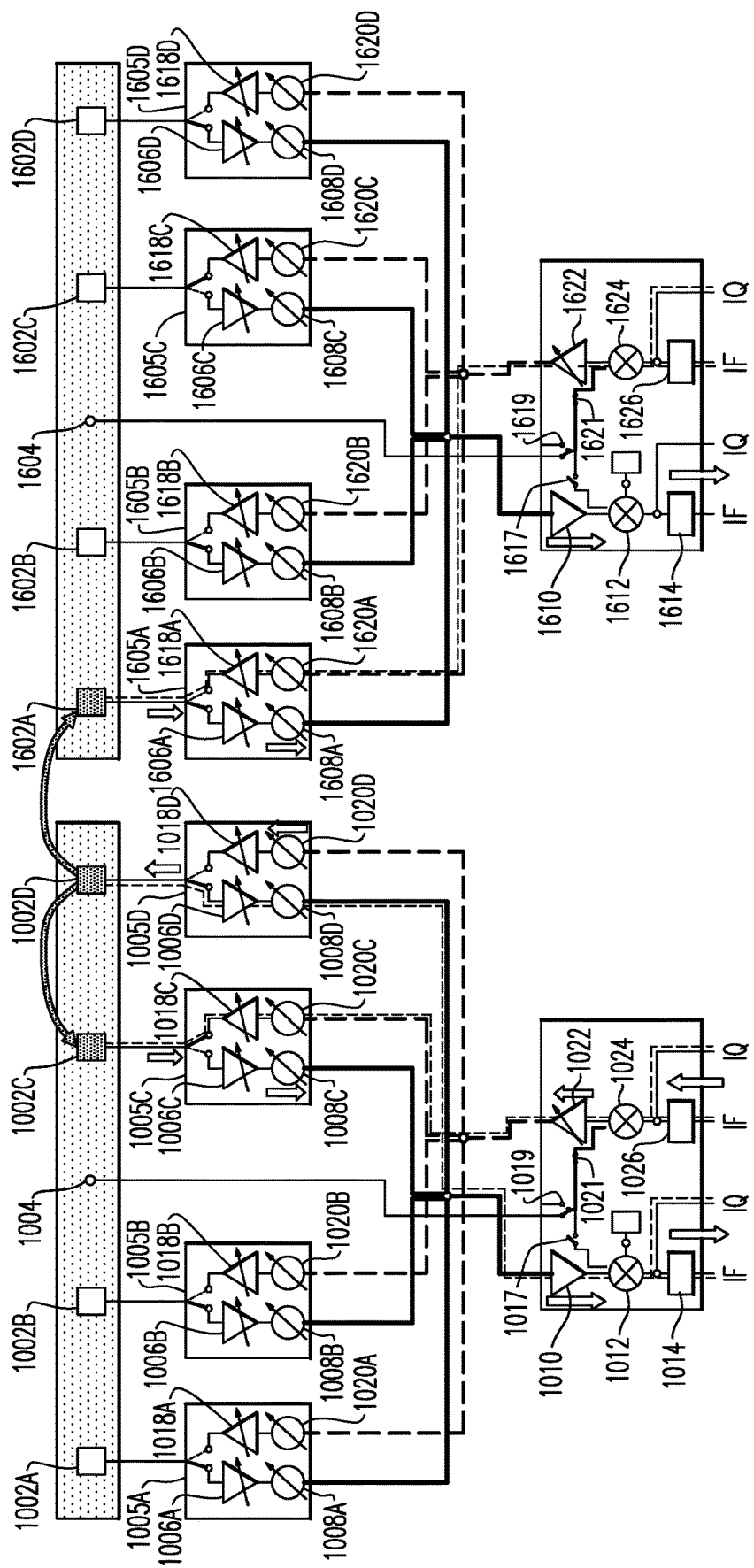
FIG. 16 illustrates signal flow for an antenna array to antenna array calibration for receive paths in an active antenna system according to an embodiment.

FIG. 16 illustrates signal flow for an antenna array to antenna array calibration for receive paths in an active antenna system according to an embodiment. FIG. 16 illustrates an example system and signal flow that can correspond to operation 706 of the process 700. The illustrated active antenna system includes a first active antenna array chip, first beamformers 1005A, 1005B, 1005C, 1005D, switches 1017, 1019, and 1021 to control the signal path to and/or from the probe 1004, first upconverter and downconverter circuitry. The first active antenna array chip can include antenna elements 1002A, 1002B, 1002C, and 1002D and a probe 1004. The first beamformers 1005A, 1005B, 1005C, 1005D can each include a respective programmable gain amplifier 1006A, 1006B, 1006C, and 1006D for the receive path, a phase shifter 1008A, 1008B, 1008C, and 1008D for the receive path, a programmable gain amplifier 1018A, 1018B, 1018C, 1018D for the transmit path, and/or a phase shifter 1020A, 1020B, 1020C, and 1020D for the transmit path. The upconverter circuitry can include a mixer 1024, a balancer 1026, and an amplifier 1022. The downconverter circuitry can include an amplifier 1010, a mixer 1012, and a balancer 1014.

The illustrated active antenna system also includes a second active antenna array chip, second beamformers 1605A, 1605B, 1605C, 1605D, switches 1617, 1619, and 1621 to control the signal path to and/or from the probe 1604, second upconverter circuitry and downconverter circuitry. The second active antenna array chip can include antenna elements 1602A, 1602B, 1602C, and 1602D and a probe 1604. The second beamformers 1605A, 1605B, 1605C, 1605D can each include a respective programmable gain amplifier 1606A, 1606B, 1606C, and 1606D for the receive path, a phase shifter 1608A, 1608B, 1608C, and 1608D for the receive path, a programmable gain amplifier 1618A, 1618B, 1618C, 1618D for the transmit path, and/or a phase shifter 1620A, 1620B, 1620C, and 1620D for the transmit path. The second upconverter circuitry can include a mixer 1624, a balancer 1626, and an amplifier 1622. The second downconverter circuitry can include an amplifier 1610, a mixer 1612, and a balancer 1614.

A signal can be transmitted from a first antenna element 1002D of a first antenna array and received at a second antenna element 1002C of the first antenna array. Another signal can be transmitted from the first antenna element 1002D and received at a third antenna element 1602A of a second antenna array. Because the first antenna element is substantially equidistant to the second and third antenna elements, the receive paths for the second antenna element 1002C of the first antenna array and the third antenna element 1602A of the second array can be calibrated relative to each other.

Figure 17:
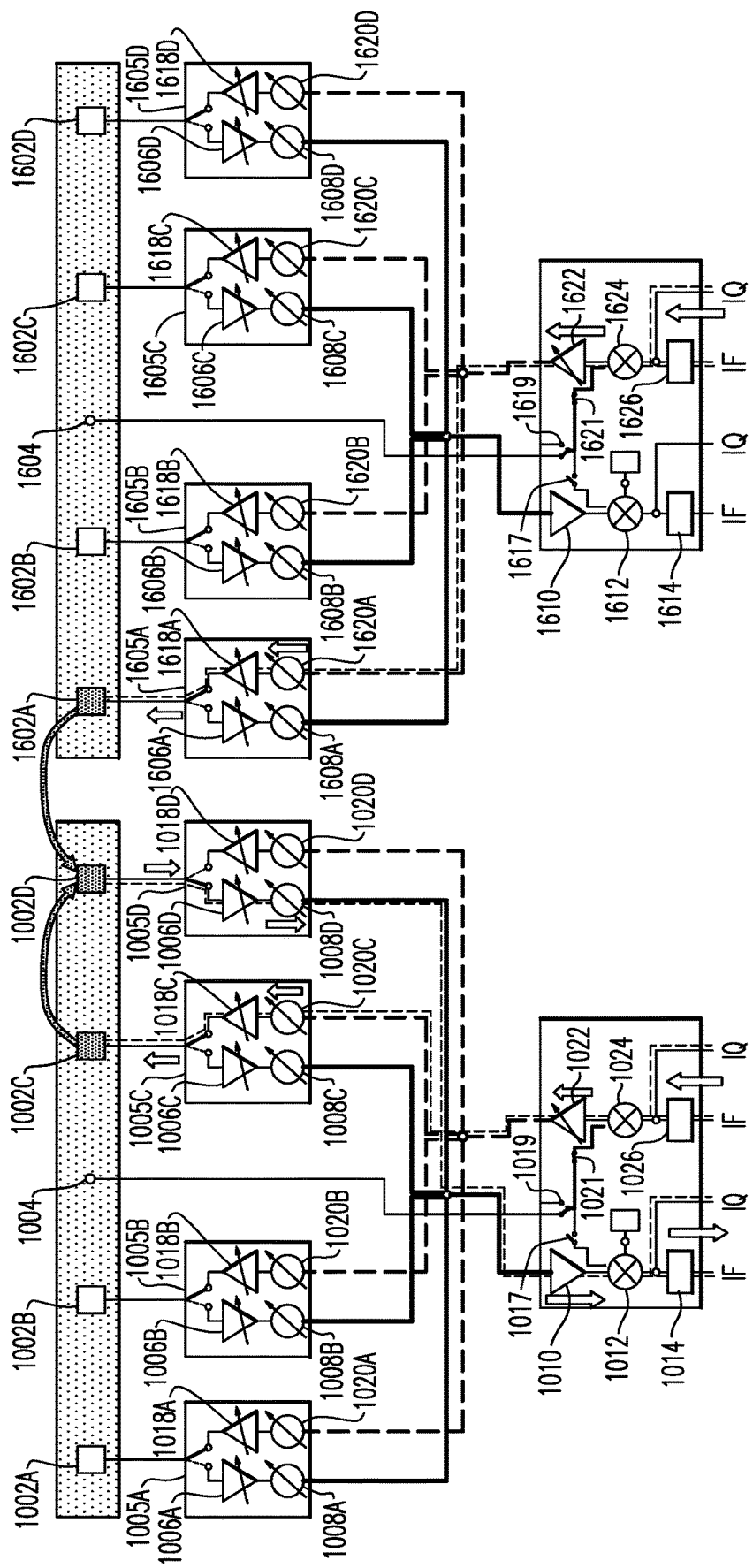
FIG. 17 illustrates signal flow for an antenna array to antenna array calibration for transmit paths in an active antenna system according to an embodiment.

FIG. 17 illustrates signal flow for an antenna array to antenna array calibration for transmit paths in an active antenna system according to an embodiment. FIGS. 16 and 17 correspond to the same active antenna system in different states FIG. 17 illustrates an example system and signal flow that can correspond to operation 708 of the process 700. A signal can be transmitted from a second antenna element 1002C of a first antenna array and received at a first antenna element 1002D of the first antenna array. Another signal can be transmitted from the third antenna element 1602A and received at the first antenna element 1002D of a first antenna array. Because the first antenna element is substantially equidistant to the second and third antenna elements, the transmit paths for the second antenna element 1002C of the first antenna array and the third antenna element 1602A of the second array can be calibrated relative to each other.

Accordingly, the transmit paths and/or receive paths corresponding to active antenna elements of different active antenna array chips can be calibrated relative to each other. This can enable calibration of active antenna systems that include multiple active antenna element arrays.

Additional Embodiments

Any of the principles and advantages discussed herein can be applied to other systems, not just to the systems described above. Some embodiments can include a subset of features and/or advantages set forth herein. The elements and operations of the various embodiments described above can be combined to provide further embodiments. The acts of the methods discussed herein can be performed in any order as appropriate. Moreover, the acts of the methods discussed herein can be performed serially or in parallel, as appropriate. While circuits are illustrated in particular arrangements, other equivalent arrangements are possible.

Any of the principles and advantages discussed herein can be implemented in connection with any other systems, apparatus, or methods that benefit could from any of the teachings herein. For instance, any of the principles and advantages discussed herein can be implemented in connection with any devices with a need to adjust the amplitude or phase of a phased array.

Aspects of this disclosure can be implemented in various electronic devices. For instance, one or more of the above phased array embodiments can be implemented in accordance with any of the principles and advantages discussed herein can be included in various electronic devices. Examples of the electronic devices can include, but are not limited to, cell phone base stations, radar systems, radar detectors, consumer electronic products, parts of the consumer electronic products such as semiconductor die and/or packaged modules, electronic test equipment, etc. Examples of the electronic devices can also include communication networks. The consumer electronic products can include, but are not limited to, a phone such as a smart phone, a laptop computer, a tablet computer, a wearable computing device such as a smart watch or an ear piece, an automobile, a camcorder, a camera, a digital camera, a portable memory chip, a washer, a dryer, a washer/dryer, a copier, a facsimile machine, a scanner, a multifunctional peripheral device, a wireless access point, a router, etc. Further, the electronic device can include unfinished products, including those for industrial and/or medical applications.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual embodiment (assuming that the functionality of the depicted circuits is not adversely affected). Additionally, the words "herein," "above," "below," and words of similar import, when used in this application, shall refer to this application as a whole and not to any particular portions of this application. Where the context permits, words in the Detailed Description of Certain Embodiments using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values or distances provided herein are intended to include similar values within a measurement error.

While certain embodiments have been described, these embodiments have been presented by way of example only, and are not intended to limit the scope of the disclosure. Indeed, the novel apparatus, systems, and methods described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An active antenna apparatus with relative calibration for calibrating antenna elements, the active antenna apparatus comprising:

antenna elements comprising a first antenna element, a second antenna element, a third antenna element, and a fourth antenna element, wherein the second antenna element is disposed substantially equidistant to the first antenna element and the third antenna element;
a first probe disposed substantially equidistant to the first and second antenna elements;
a second probe disposed substantially equidistant to the first antenna element and the fourth antenna element; and
calibration circuitry configured to:
identify a first relative relationship between the first antenna element and the second antenna element based on observations of one or more probe signals propagating between (i) the first probe and the first antenna element and (ii) the first probe and second antenna element;
identify a second relative relationship between the first antenna element and the third antenna element using one or more antenna signals propagating between (i) the second antenna element and the first antenna element and (ii) the second antenna element and third antenna element;
identify a third relative relationship between the first antenna element and the fourth antenna element based on observations of one or more second probe signals propagating between (i) the second probe and the first antenna element and (ii) the second probe and the fourth antenna element; and
determine calibration information for calibrating one or more of the antenna elements based on the first relative relationship, the second relative relationship, and the third relative relationship.

2. The active antenna apparatus of claim 1, wherein the calibration circuitry is further configured to determine a fourth relative relationship between a fifth antenna element and a sixth antenna element based on observations of signals of the fifth antenna element and the sixth antenna element propagating simultaneously.

3. The active antenna apparatus of claim 1, wherein to determine the calibration information includes determining at least one of a relative amplitude relationship or a relative phase relationship among the first, the second, and the third antenna elements.

4. The active antenna apparatus of claim 1, wherein a chip comprises the antenna elements and the chip has two or fewer probe input/outputs.

5. The active antenna apparatus of claim 1, further comprising beamforming circuitry and upconverter/downconverter circuitry in a signal path between the antenna elements and the calibration circuitry.

6. The active antenna apparatus of claim 5, further comprising a coupler and a switch configured to apply a signal from a mixer of the upconverter/downconverter circuitry to the first probe.

7. The active antenna apparatus of claim 1, wherein the active antenna apparatus is configured to transmit at least one of the one or more probe signals from the first probe and receive the at least one of the one or more probe signals at the first antenna element, wherein the calibration circuitry is configured to identify the first relative relationship based on the at least one of the one or more probe signals received at the first antenna element.

8. The active antenna apparatus of claim 1, wherein the calibration circuitry is further configured to determine a fourth relative relationship between the first antenna element and a fifth antenna, and wherein the first antenna element is on a different chip than the fifth antenna element.

9. The active antenna apparatus of claim 8, wherein the first, second, third, and fourth antenna elements are on a same chip.

10. The active antenna apparatus of claim 1, wherein a single chip comprises 64 antenna elements and no more than two probes, wherein the two probes comprise the first and second probes, and wherein the 64 antenna elements comprise the first, second, third, and fourth antenna elements.

11. An electronically-implemented method of an antenna element calibration using relative calibration relationships to calibrate antenna elements, the method comprising:
determining, using calibration circuitry, a first relative relationship between a first antenna element and a second antenna element based on a probe signal applied by a probe, wherein the probe is disposed substantially equidistant to the first antenna element and the second antenna element;
determining, using the calibration circuitry, a second relative relationship between the first antenna element and a third antenna element based on an antenna element signal applied by the second antenna element, wherein the second antenna element is disposed substantially equidistant to the first antenna element and the third antenna element;
determining, using the calibration circuitry, a third relative relationship between the first antenna element and a fourth antenna element based on a radio frequency signal propagating between the first antenna element and a fifth antenna element, wherein the fifth antenna element is on a different chip than the first antenna element;
identifying a fourth relative relationship between the first antenna element and the fourth antenna element based on observations of one or more second probe signals propagating between (i) a second probe and the first antenna element and (ii) the second probe and the fourth antenna element, wherein the second probe is disposed substantially equidistant to the first antenna element and the fourth antenna element, and
storing calibration information for calibrating one or more of the antenna elements based on the first relative relationship, the second relative relationship, the third relative relationship, and the fourth relative relationship.

12. The method of claim 11, wherein the method further comprises adjusting a programmable gain amplifier of a beamformer based on the calibration information, wherein the beamformer is coupleable to at least one of the first antenna element, the second antenna element, or the third antenna element.

13. The method of claim 11, wherein the method further comprises adjusting a phase shifter of a beamformer based on the calibration information, wherein the beamformer is coupleable to at least one of the first antenna element, the second antenna element, or the third antenna element.

14. The method of claim 11, wherein the method further comprises at least one of:
controlling one or more switches to electrically connect the probe to a receive path; or
controlling one or more switches to electrically connect the probe to a transmit path.

15. The method of claim 11, wherein first, second, third, and fourth antenna elements are on a same chip.

16. An active antenna apparatus with relative antenna element calibration, the active antenna apparatus comprising:
an active antenna array chip comprising:

an antenna array comprising NxM antenna elements, wherein N is a first positive integer and M is a second positive integer, wherein the antenna elements comprise a first antenna element, a second antenna element, a third antenna element, and a fourth antenna element; and a plurality of probes comprising a first probe disposed substantially equidistant to the first antenna element and the second antenna element and a second probe disposed equidistant to the second antenna element and the fourth antenna element;

wherein the active antenna array chip has less than (N−1)*(M−1) probe input/outputs;

up-converter circuitry;

down-converter circuitry;

beamforming circuitry, wherein each antenna element of the antenna elements is electrically connectable to the down-converter circuitry and the up-converter circuitry by way of the beamforming circuitry; and calibration circuitry configured to:
  identify a first relative relationship between the first antenna element and the second antenna element based on observations of one or more probe signals propagating between (i) the first probe and the first antenna element and (ii) the first probe and the second antenna element;
  identify a second relative relationship between the first antenna element and the third antenna element using one or more antenna signals propagating between (i) the second antenna element and the first antenna element and (ii) the second antenna element and the third antenna element;
  identify a third relative relationship between the first antenna element and the fourth antenna element based on observations of one or more second probe signals propagating between (i) the second probe and the first antenna element and (ii) the second probe and the fourth antenna element, and
  determine calibration information for calibrating one or more of the antenna elements based on the first, second, and third relative relationships.

17. The active antenna apparatus of claim 16, wherein the calibration circuitry is included in a digital signal processor of the active antenna apparatus.

18. The active antenna apparatus of claim 16, wherein the active antenna array chip has 2 or fewer probe input/outputs.

19. The active antenna apparatus of claim 16, wherein the up-converter circuitry comprises a mixer, and the active antenna apparatus further comprising a coupler and a switch together configured to apply a signal from the mixer to the first probe.

20. The active antenna apparatus of claim 16, wherein the calibration circuitry is further configured to determine a fourth relative relationship between the first antenna element and a fifth antenna, and wherein the first antenna element is on a different chip than the fifth antenna element.

* * * * *

UNITED STATES PATENT AND TRADEMARK OFFICE
CERTIFICATE OF CORRECTION

PATENT NO. : 11,177,567 B2  
APPLICATION NO. : 15/904045  
DATED : November 16, 2021  
INVENTOR(S) : Ahmed I. Khalil Page 1 of 1

It is certified that error appears in the above-identified patent and that said Letters Patent is hereby corrected as shown below:

On the Title Page

In Column 1, item (73), Assignee, Line 2, delete "ANALOG DEVICES GLOBAL UNLIMITED COMPANY" and insert -- ANALOG DEVICES INTERNATIONAL UNLIMITED COMPANY --.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*